US012539151B2

(12) United States Patent
Kobayashi et al.

(10) Patent No.: US 12,539,151 B2
(45) Date of Patent: Feb. 3, 2026

(54) ORTHOPEDIC FIXATION SYSTEM

(71) Applicant: DePuy Synthes Products, Inc., Raynham, MA (US)

(72) Inventors: Kenneth Kobayashi, Downington, PA (US); Troy Probst, Wilmington, DE (US); Eric Lui, Royersford, PA (US)

(73) Assignee: DePuy Synthes Products, Inc., Raynham, MA (US)

( * ) Notice: Subject to any disclaimer, the term of this patent is extended or adjusted under 35 U.S.C. 154(b) by 0 days.

(21) Appl. No.: 18/776,880

(22) Filed: Jul. 18, 2024

(65) Prior Publication Data
US 2026/0020886 A1    Jan. 22, 2026

(51) Int. Cl.
*A61B 17/80* (2006.01)
*A61B 17/00* (2006.01)

(52) U.S. Cl.
CPC ........ *A61B 17/8004* (2013.01); *A61B 17/808* (2013.01); *A61B 17/809* (2013.01); *A61B 2017/00867* (2013.01)

(58) Field of Classification Search
CPC ............ A61B 17/0642; A61B 17/8004; A61B 17/808; A61B 17/809
See application file for complete search history.

(56) References Cited

U.S. PATENT DOCUMENTS

| 4,906,189 A | 3/1990 | Knapp |
| 5,662,655 A | 9/1997 | Laboureau et al. |
| 5,741,256 A | 4/1998 | Bresina |
| 5,779,707 A | 7/1998 | Bertholet et al. |
| 5,908,422 A | 6/1999 | Bresina |
| 5,993,476 A | 11/1999 | Groiso |
| 6,409,730 B1 | 6/2002 | Green et al. |
| 6,533,789 B1 | 3/2003 | Hall, IV et al. |
| 6,616,669 B2 | 9/2003 | Ogilvie et al. |
| 6,645,209 B2 | 11/2003 | Hall, IV et al. |
| 6,773,437 B2 | 8/2004 | Ogilvie et al. |
| 7,229,445 B2 | 6/2007 | Hayeck et al. |
| 7,837,709 B2 | 11/2010 | Dutoit et al. |
| 8,579,938 B2 | 11/2013 | Heinrich et al. |

(Continued)

FOREIGN PATENT DOCUMENTS

| WO | 2015131106 A1 | 9/2015 |
| WO | 2015176600 A1 | 11/2015 |

(Continued)

*Primary Examiner* — Larry E Waggle, Jr.
(74) *Attorney, Agent, or Firm* — Christopher L. Makay

(57) ABSTRACT

An orthopedic fixation system includes an implant transitionable between a natural shape and an insertion shape and an implant retainer. The implant includes a plate segment, a blade segment extending from the plate segment, a transition section within the blade segment, and a retainer receiver traversing the transition section. The transition section deforms to move the implant between the natural shape and the insertion shape. The implant retainer, upon transition of the implant from the natural shape to the insertion shape, engages the implant at the retainer receiver. The implant retainer upon engagement with the implant spans the transition section such that the implant retainer constrains the implant and holds the implant in the insertion shape thereby preventing a transition of the implant from the insertion shape to the natural shape.

11 Claims, 39 Drawing Sheets

(56) References Cited

U.S. PATENT DOCUMENTS

| | | | |
|---|---|---|---|
| D728,104 S | 4/2015 | Katchis et al. | |
| 9,693,771 B2 | 7/2017 | Heinrich et al. | |
| 9,883,895 B2 | 2/2018 | Mikhail et al. | |
| 9,918,757 B2 | 3/2018 | Roth et al. | |
| 9,931,115 B2 | 4/2018 | Morgan et al. | |
| 10,052,103 B2 | 8/2018 | Wahl | |
| 11,000,323 B2 * | 5/2021 | Stamp | A61B 17/8061 |
| 2003/0139746 A1 | 7/2003 | Groiso | |
| 2008/0065153 A1 | 3/2008 | Allard et al. | |
| 2008/0065154 A1 | 3/2008 | Allard et al. | |
| 2013/0231667 A1 | 9/2013 | Taylor et al. | |
| 2015/0134011 A1 | 5/2015 | Medoff | |
| 2015/0313592 A1 * | 11/2015 | Coillard-Lavirotte | A61B 17/846 606/151 |
| 2017/0181779 A1 | 6/2017 | Leither et al. | |
| 2017/0196604 A1 | 7/2017 | Hartdegen et al. | |
| 2017/0209193 A1 * | 7/2017 | Hartdegen | A61B 17/8004 |
| 2018/0317906 A1 | 11/2018 | Hollis et al. | |
| 2019/0046182 A1 | 2/2019 | Krumme | |
| 2019/0117219 A1 | 4/2019 | Ritz et al. | |
| 2022/0015812 A1 * | 1/2022 | Cheney | A61B 17/8004 |

FOREIGN PATENT DOCUMENTS

| | | |
|---|---|---|
| WO | 2017207922 A1 | 12/2017 |
| WO | 2018145064 A1 | 8/2019 |

\* cited by examiner

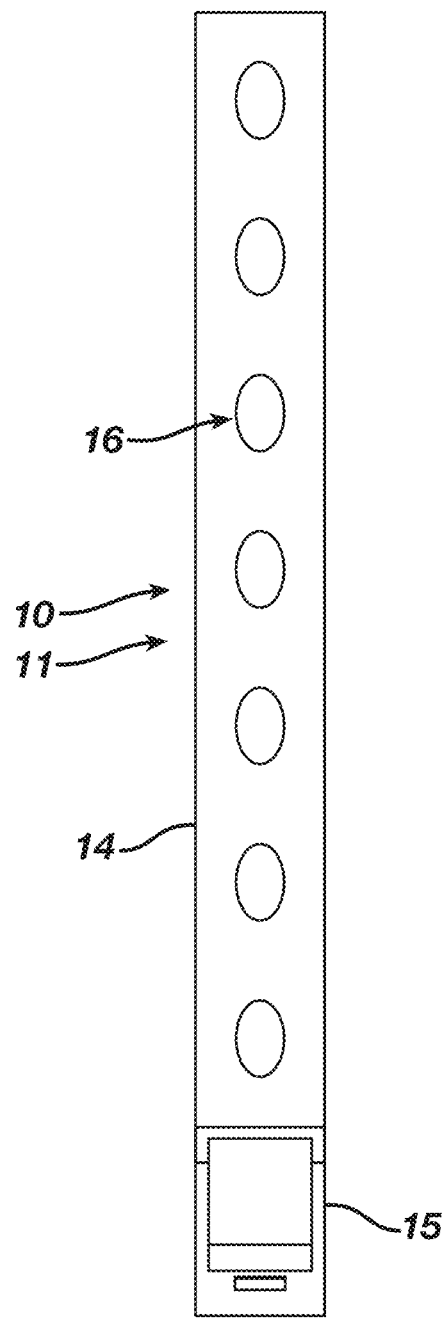
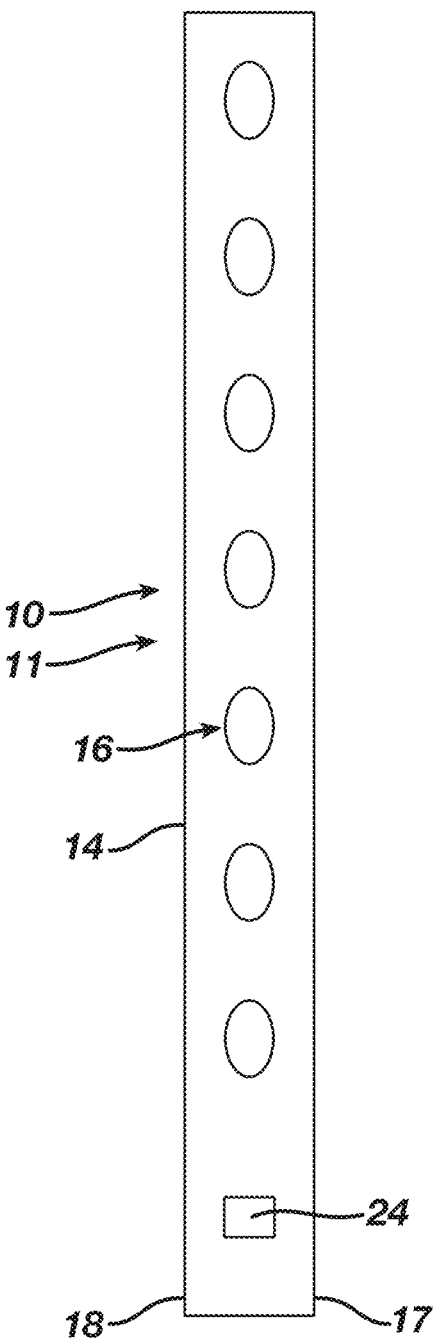
FIG. 2D  FIG. 2E

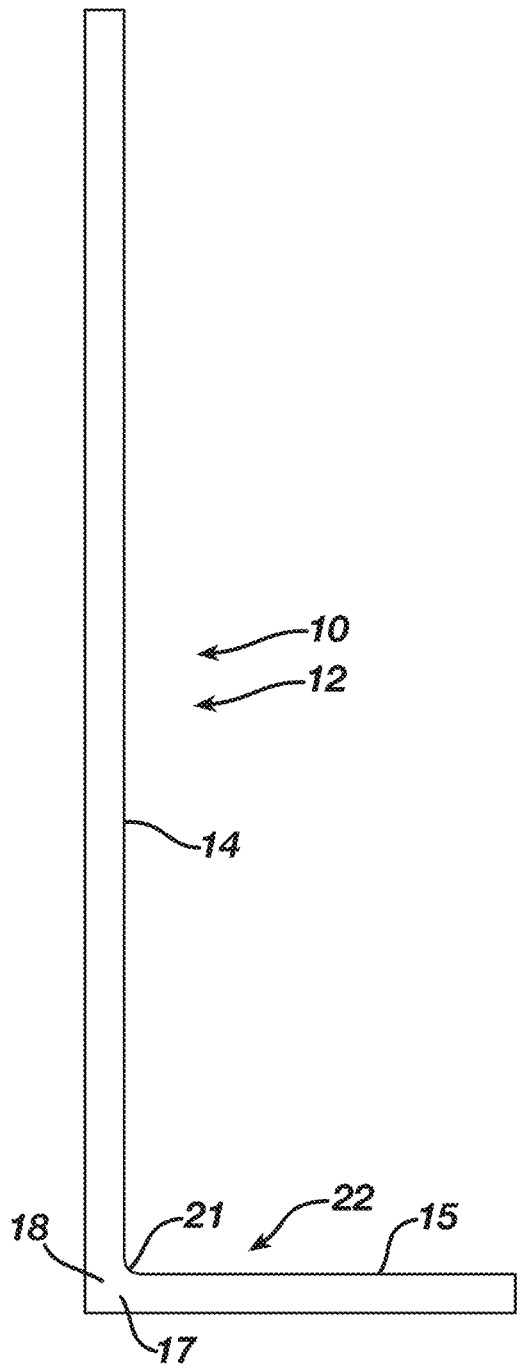
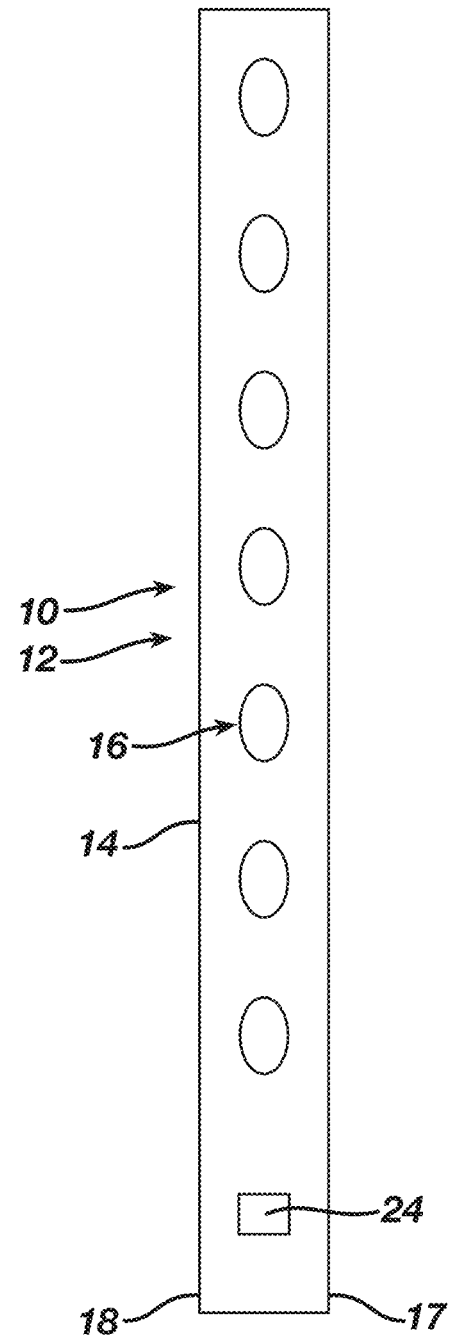
FIG. 3A  FIG. 3B

FIG. 6B  FIG. 6C  FIG. 6D

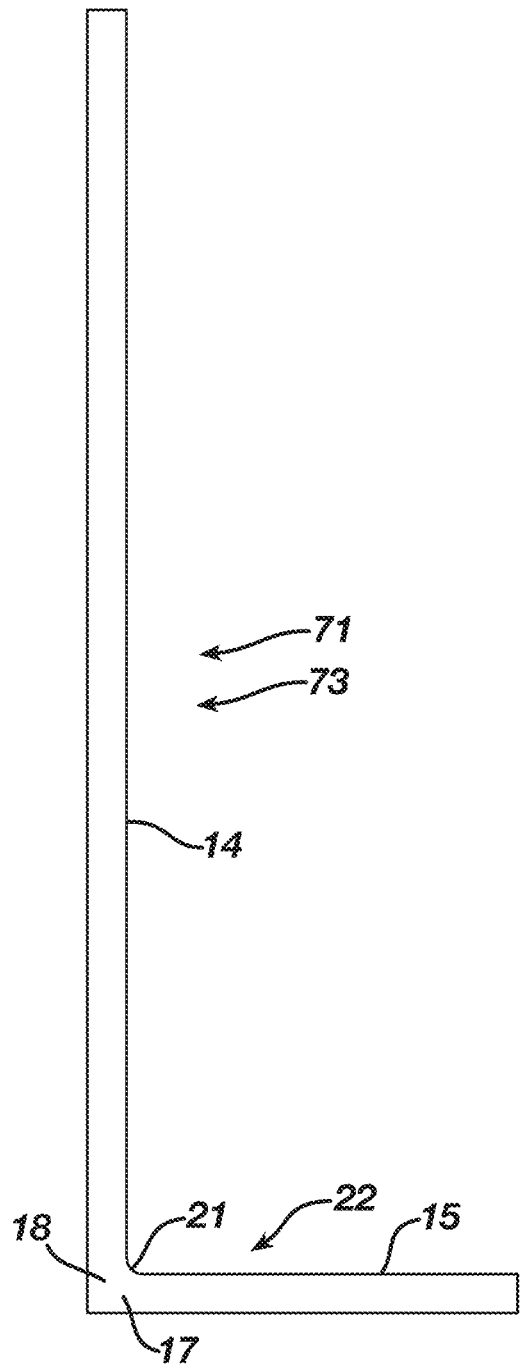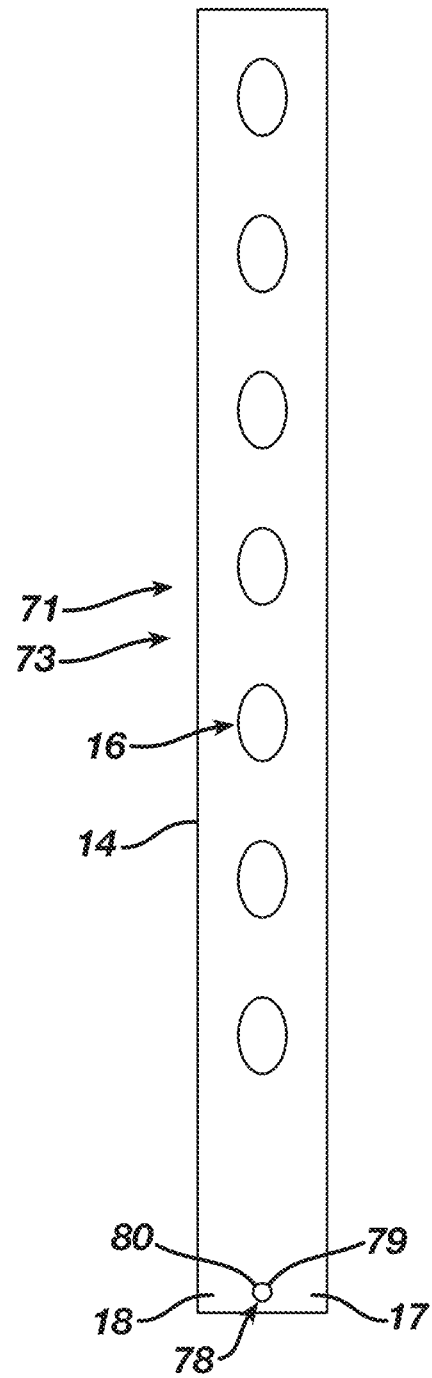
FIG. 11A  FIG. 11B

ORTHOPEDIC FIXATION SYSTEM

BACKGROUND OF THE INVENTION

1. Field of the Invention

The present invention relates generally to orthopedic fixation and, more particularly, but not way of limitation, to an orthopedic fixation system including a shape memory implant and an implant retainer.

2. Description of the Related Art

A bone, such as, for example, a long bone including but not limited to the femur and the tibia, experiencing a fracture typically is treated through a bone plate attached to the fractured bone across the fracture zone. A bone plate used in certain instances during a long bone fracture repair includes a blade-shaped portion extending approximately perpendicular from a plate portion. The plate portion attaches to the fractured bone while the blade-shaped portion extends into a channel formed in the fractured bone through the fracture zone. Alternatively, the blade-shaped portion extends into a channel formed in the fractured bone adjacent the fracture zone while the plate portion attaches to the fractured bone across the fracture zone including a lag screw through the fracture zone. While bone plates, including those with a plate portion and a blade-shaped portion, operate adequately in healing a fractured long bone, fractured long bone healing improves when compression of the fractured long bone at the fracture zone is maintained during the entire healing process. Unfortunately, bone plates, including those with a plate portion and a blade-shaped portion, currently used in fractured long bone repair often lose compression before completion of the healing process, resulting in a less than optimal outcome.

Accordingly, an orthopedic fixation system capable of maintaining compression during the entire healing process will provide an improvement in the repair of fractured long bones.

SUMMARY OF THE INVENTION

In accordance with the present invention, an orthopedic fixation system includes an implant and an implant retainer. The implant is transitionable between a natural shape and an insertion shape whereby a transition of the implant from the natural shape to the insertion shape stores deliverable energy and a transition of the implant from the insertion shape to the natural shape delivers stored energy. The implant retainer is configured to engage the implant such the implant retainer constrains the implant in the insertion shape thereby preventing a transition of the implant from the insertion shape to the natural shape.

The implant includes a plate segment and a blade segment extending from the plate segment. The implant further includes a transition section within the blade segment and a retainer receiver traversing the transition section. The transition section is located within the blade segment at a junction of the plate segment and the blade segment. Alternatively, the blade segment includes a curve whereby the transition section is located within the blade segment at the curve. The transition section deforms to move the implant between the natural shape and the insertion shape. The implant retainer, upon transition of the implant from the natural shape to the insertion shape, engages the implant at the retainer receiver whereby the implant retainer spans the transition section such that the implant retainer constrains the implant and holds the implant in the insertion shape thereby preventing a transition of the implant from the insertion shape to the natural shape.

The retainer receiver includes a first aperture extending through the plate segment and a second aperture extending through the blade segment. The first aperture is located within the plate segment adjacent the junction of the plate segment and blade segment. The second aperture is located within the blade segment adjacent the junction of the plate segment and blade segment. The retainer receiver further includes a first catch protruding into the first aperture and a second catch protruding into the second aperture. The implant retainer, upon transition of the implant from the natural shape to the insertion shape, engages the implant at the first and second apertures and further at the first and second catches whereby the implant retainer spans the transition section such that the implant retainer constrains the implant and holds the implant in the insertion shape thereby preventing a transition of the implant from the insertion shape to the natural shape.

The implant retainer includes a first retention block including a first fastener and a second retention block including a second fastener. The first fastener engages the implant at the first aperture and further at the first catch. The second retention block at the second fastener engages the implant at the second aperture and further at the second catch. The implant retainer further includes a fastener configured to connect the first retention block with the second retention block. The connected first and second retention blocks span the transition section such that the connected first and second retention blocks constrain the implant and hold the implant in the insertion shape thereby preventing a transition of the implant from the insertion shape to the natural shape.

The first retention block includes a first bore extending therethrough along a pathway from a rear of the first retention block to a first block interface of the first retention block. The second retention block includes a second bore extending therethrough along a pathway from a block interface of the second retention block toward a rear of the second retention block. The engagements of the first retention block and the second retention block with the implant places the first block interface next to the second block interface with the first bore in alignment with the second bore. The fastener inserts into the first bore and the second bore to connect the first retention block with the second retention block. The connected first and second retention blocks span the transition section such that the connected first and second retention blocks constrain the implant and hold the implant in the insertion shape thereby preventing a transition of the implant from the insertion shape to the natural shape.

The first fastener includes a first post extending therefrom and a first detent extending from the first post. The second fastener includes a second post extending therefrom and a second detent extending from the second post. The engagement of the first retention block with the implant includes insertion of the first fastener into the first aperture whereby the first detent interlocks with the first catch. The engagement of the second retention block with the implant includes insertion of the second fastener into the second aperture whereby the second detent interlocks with the second catch. The fastener connects the first retention block with the second retention block with the first detent interlocked with the first catch and the second detent interlocked with the second catch. The connected first and second retention blocks span the transition section such that the connected first and second retention blocks constrain the implant and hold the implant in the insertion shape thereby preventing a transition of the implant from the insertion shape to the natural shape.

The retainer receiver in an alternative includes a bore traversing the transition section. The bore begins in an entrance located within the plate segment at the junction of the plate segment and the blade segment, traverses the junction, and extends into the blade segment such that the bore traverses the transition section. The implant retainer, upon transition of the implant from the natural shape to the insertion shape, inserts into the bore and more particularly into the bore beginning at the entrance thereof whereby the implant retainer extends into the blade segment while spanning the transition section such that the implant retainer constrains the implant and holds the implant in the insertion shape thereby preventing a transition of the implant from the insertion shape to the natural shape.

The implant retainer, when the retainer receiver is a bore traversing the transition section, comprises a set screw. The set screw, upon transition of the implant from the natural shape to the insertion shape, inserts into the bore and more particularly into the bore beginning at the entrance thereof whereby the set screw extends into the blade segment while spanning the transition section such that the implant retainer constrains the implant and holds the implant in the insertion shape thereby preventing a transition of the implant from the insertion shape to the natural shape.

It is therefore an object of the present invention to provide an orthopedic fixation system with an implant transitionable between a natural shape and an insertion shape, comprising a plate segment, a blade segment extending from the plate segment, a transition section within the blade segment, and a retainer receiver traversing the transition section.

It is another object of the present invention to provide an orthopedic fixation system with an implant retainer configured to engage the implant at the retainer receiver whereby the implant retainer spans the transition section such that the implant retainer constrains the implant and holds the implant in the insertion shape thereby preventing a transition of the implant from the insertion shape to the natural shape.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

BRIEF DESCRIPTION OF DRAWINGS

FIG. 2D is a front view illustrating the implant of the orthopedic fixation system according to the first embodiment in the natural shape.

FIG. 2E is a rear view illustrating the implant of the orthopedic fixation system according to the first embodiment in the natural shape.

FIG. 3A is a side view illustrating the implant of the orthopedic fixation system according to the first embodiment in an insertion shape.

FIG. 3B is a rear view illustrating the implant of the orthopedic fixation system according to the first embodiment in the insertion shape.

FIG. 6B is a side view illustrating the second retaining member of the implant retainer of the orthopedic fixation system according to the first embodiment.

FIG. 6C is a rear view illustrating the first retaining member of the implant retainer of the orthopedic fixation system according to the first embodiment.

FIG. 6D is a cross-sectional side view illustrating the first retaining member of the implant retainer of the orthopedic fixation system according to the first embodiment.

FIG. 11A is a side view illustrating the implant of the orthopedic fixation system according to the second embodiment in an insertion shape.

FIG. 11B is a rear view illustrating the implant of the orthopedic fixation system according to the second embodiment in the insertion shape.

DETAILED DESCRIPTION OF THE PREFERRED EMBODIMENTS

Figure 1:
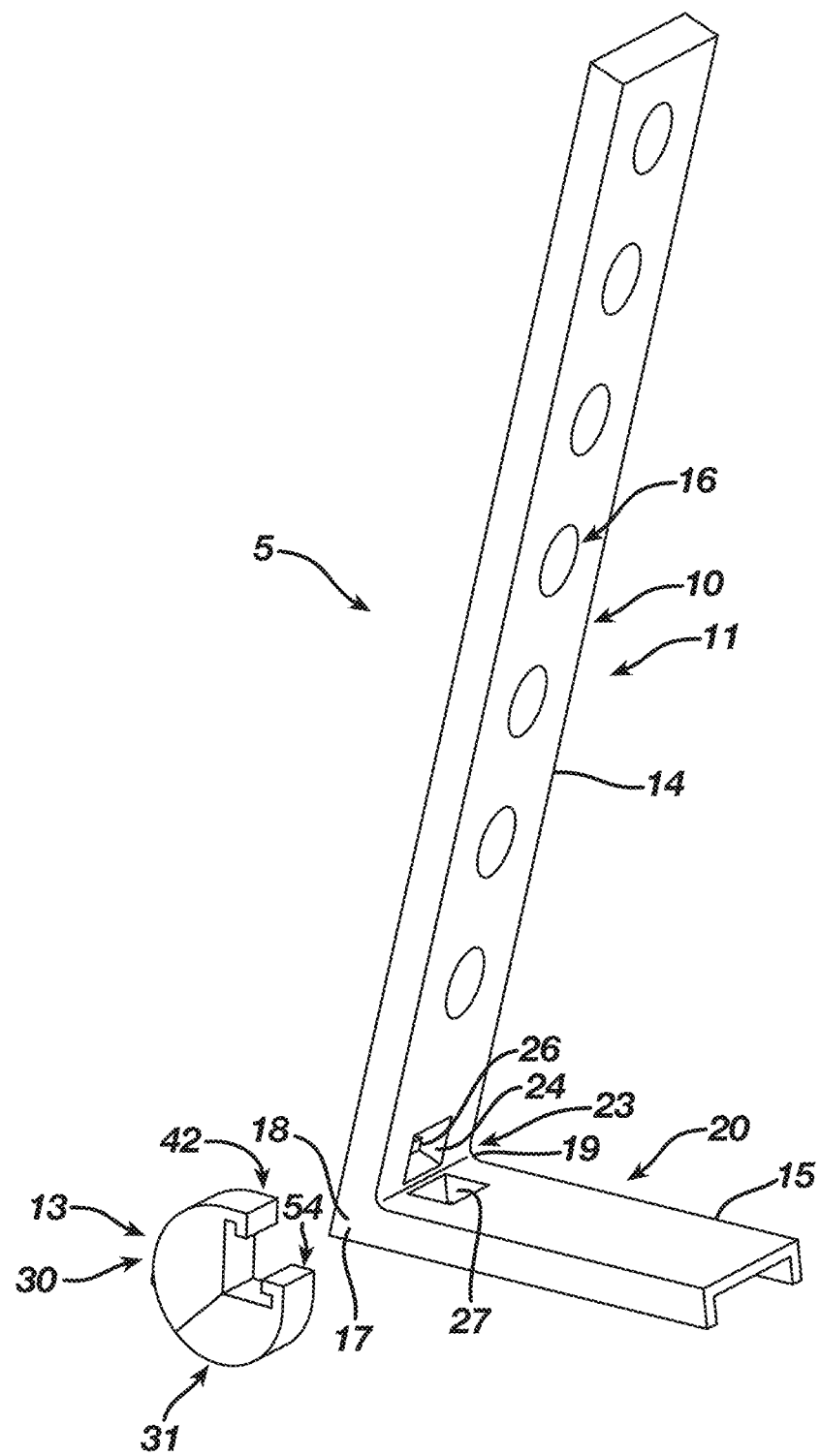
FIG. 1 is a top isometric view illustrating an orthopedic fixation system according to a first embodiment.
Figure 2A:
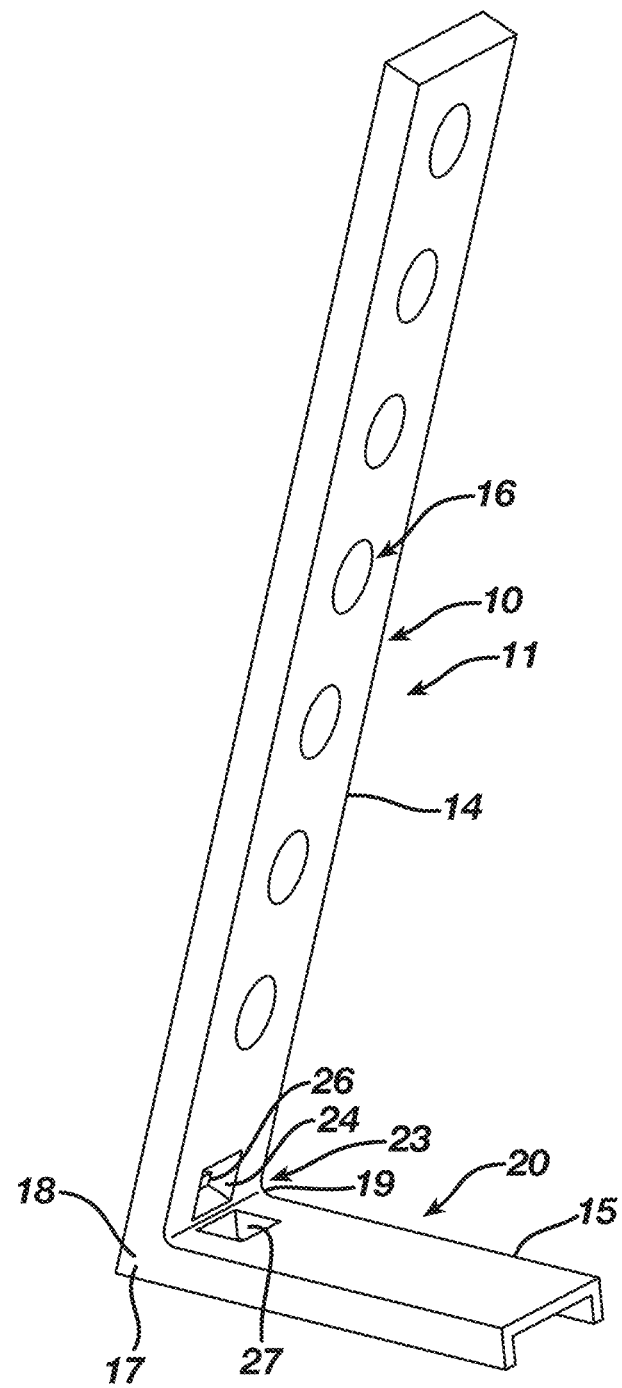
FIG. 2A is a top isometric view illustrating an implant of the orthopedic fixation system according to the first embodiment in a natural shape.
Figure 2B:
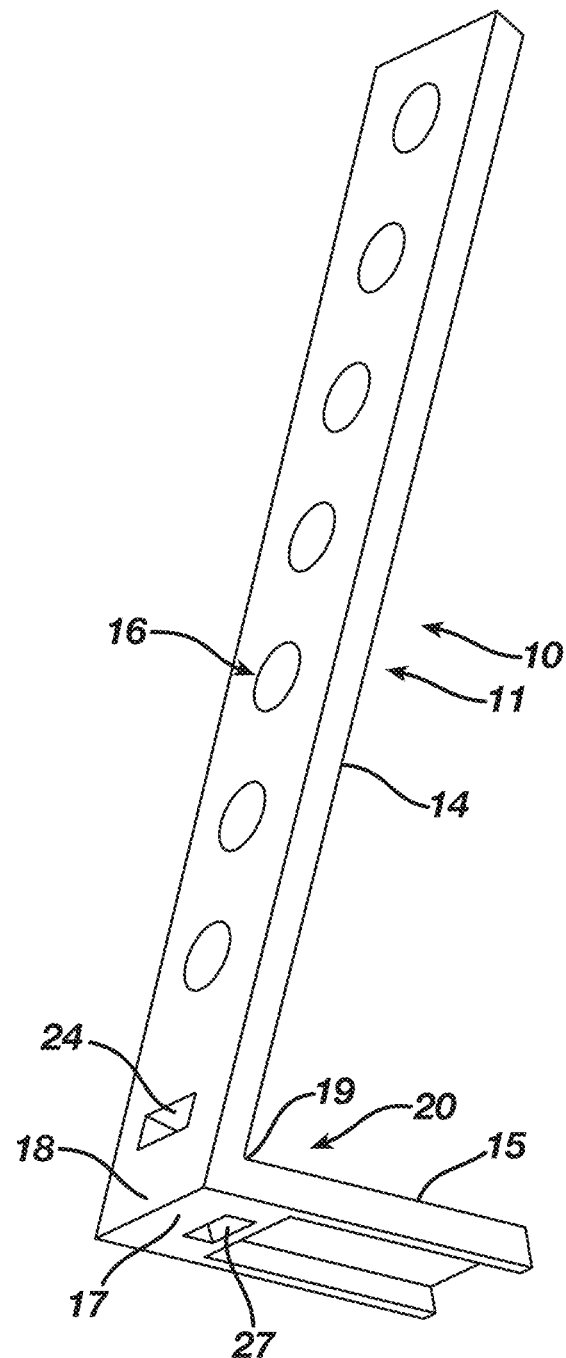
FIG. 2B is a bottom isometric view illustrating the implant of the orthopedic fixation system according to the first embodiment in the natural shape.
Figure 2C:
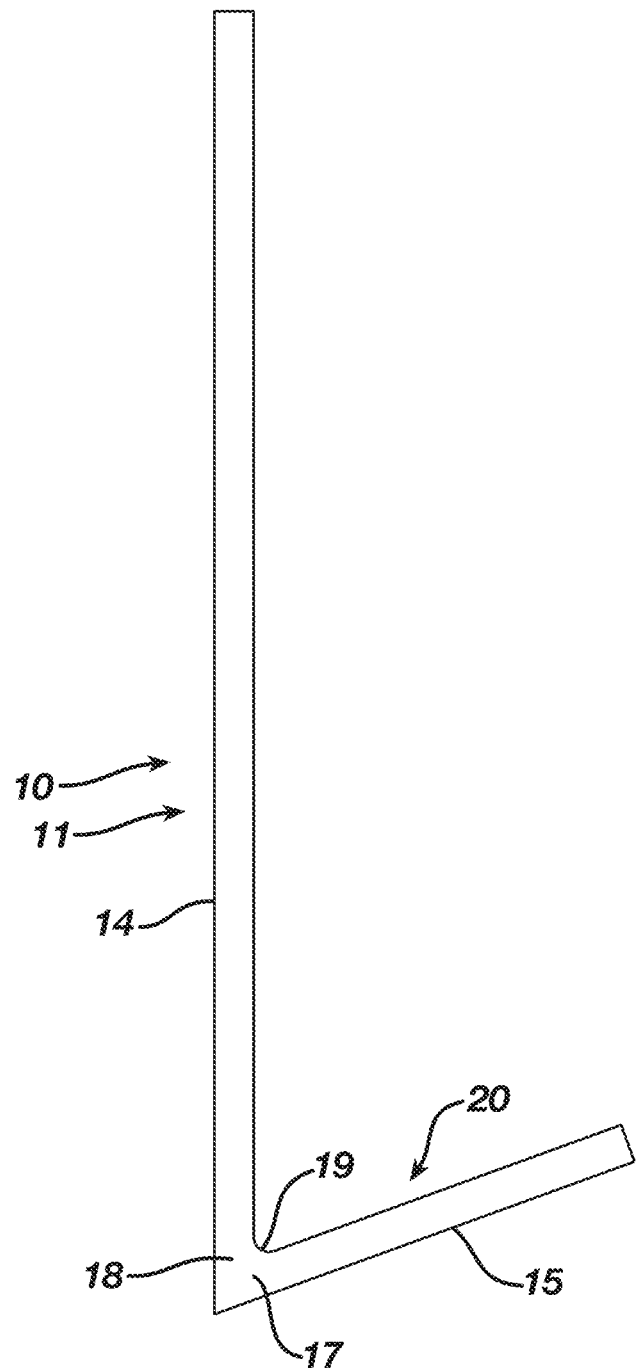
FIG. 2C is a side view illustrating the implant of the orthopedic fixation system according to the first embodiment in the natural shape.
Figure 2F:
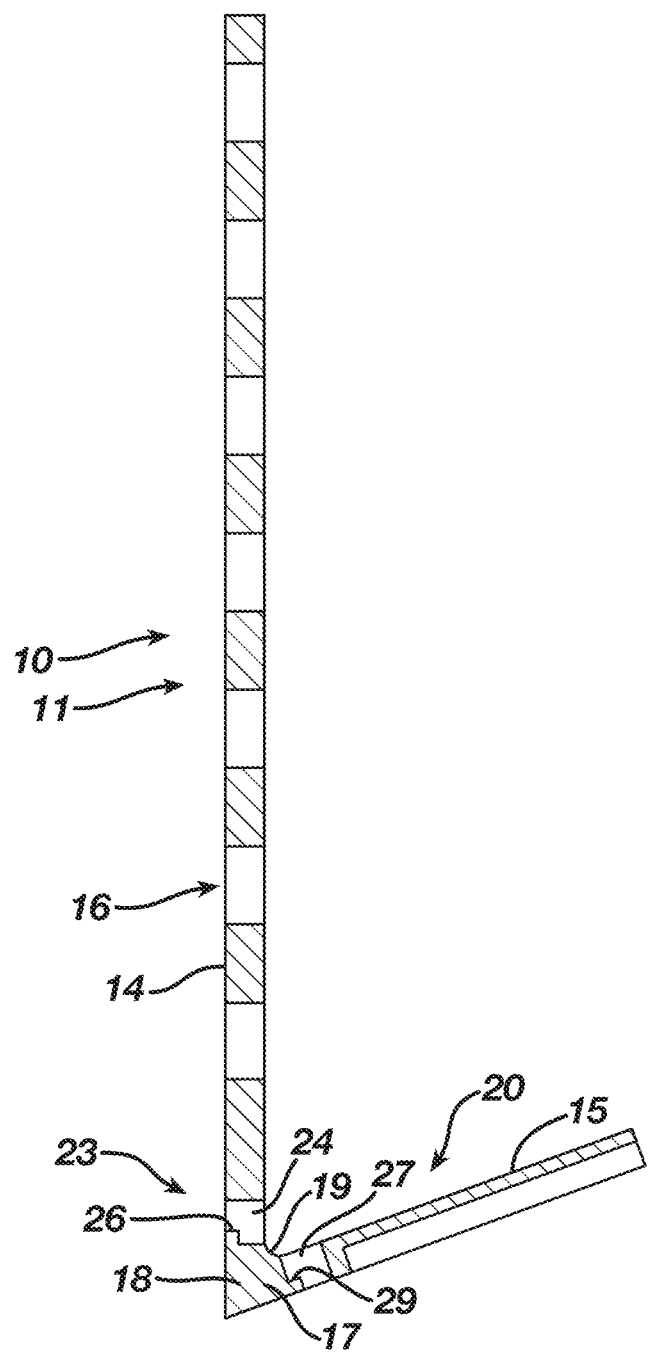
FIG. 2F is a cross-sectional side view illustrating the implant of the orthopedic fixation system according to the first embodiment in the natural shape.

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

An orthopedic fixation system 5 according to a first embodiment as illustrated in FIGS. 1 and 7A-7C includes an implant 10 transitionable between a natural shape 11 and an insertion shape 12. The orthopedic fixation system 5 further includes an implant retainer 13 configured to engage the implant 10 and constrain the implant 10 in the insertion shape 12.

Figure 3C:
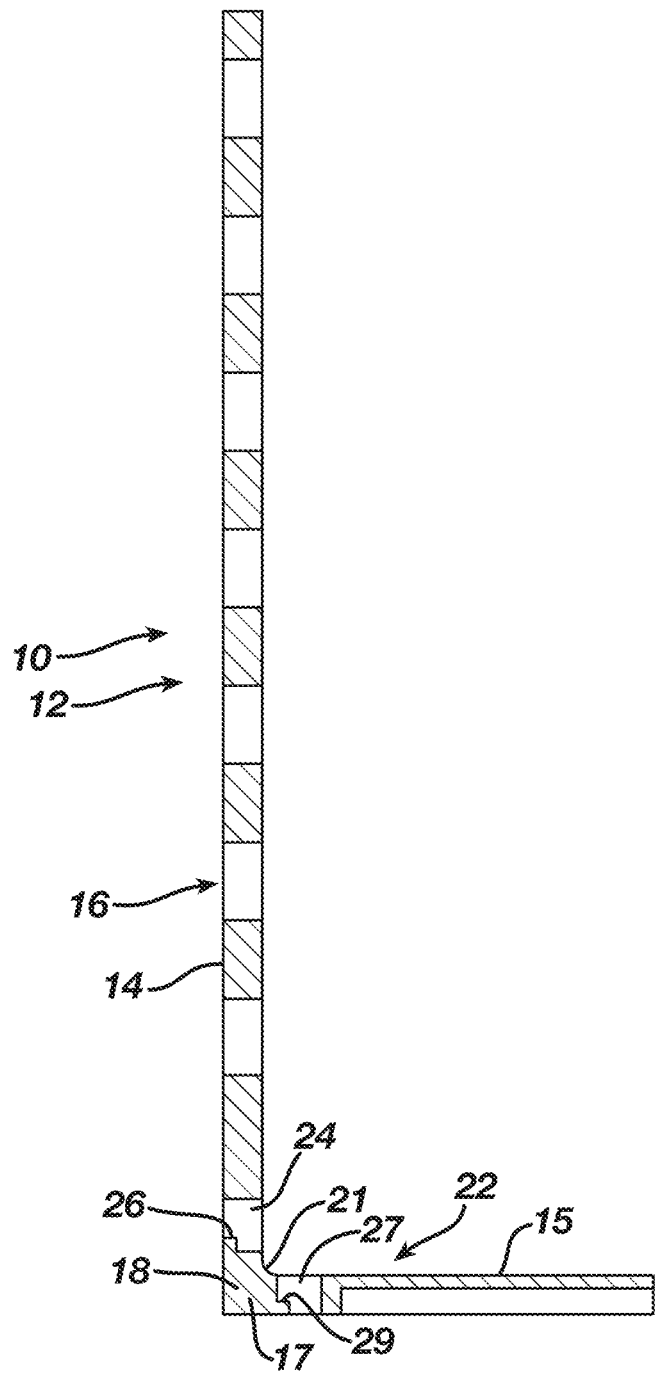
FIG. 3C is a cross-sectional side view illustrating the implant of the orthopedic fixation system according to the first embodiment in the insertion shape.

FIGS. 1 and 2A-2F illustrate the implant 10 in the natural shape 11, whereas FIGS. 3A-3C illustrate the implant 10 in the insertion shape 12. The implant 10 in the first embodiment may be manufactured from a shape memory material with superelastic or temperature dependent properties (e.g., Nitinol) such that the implant 10 transitions between the natural shape 11 and the insertion shape 12. The implant 10 when deformed from the natural shape 11 to the insertion shape 12 stores energy deliverable to bone, bones, or bone pieces, such as, for example, a long bone including but not limited to the femur and the tibia. In accordance with its manufacture from shape memory material, the implant 10 begins in the natural shape 11, is transitionable to the insertion shape 12, and, once implanted in bone, bones, or bone pieces, attempts to transition from the insertion shape 12 to the natural shape 11 whereby the implant 10 delivers the energy stored therein to the bone, bones, or bone pieces in order to affix the bone, bones, or bone pieces and promote a healing thereof. In the first embodiment, attempted transition of the implant 10 from the insertion shape 12 to the natural shape 11 continuously compresses the bone, bones, or bone pieces to promote fusion thereof.

The implant 10 includes a plate segment 14 and a blade segment 15 extending angularly from the plate segment 14. The plate segment 14 is configured for placement adjacent a bone, bones, or bone pieces in a position that allows insertion of the blade segment 15 into the bone or one of the bones or bone pieces. The plate segment 14 includes at least one opening 16 and preferably multiple openings 16 configured to receive therethrough a fixation device, such as a biocompatible locking, non-locking, or self-tapping bone screw, that secures the plate segment 14 to the bone, bones, or bone pieces adjacent therewith. Although the plate segment 14 has been illustrated as linear, one of ordinary skill in the art will recognize the plate segment 14 may include a curvature or curvatures as necessary for the plate segment 14 to seat atop the bone, bones, or bone pieces.

Figure 7A:
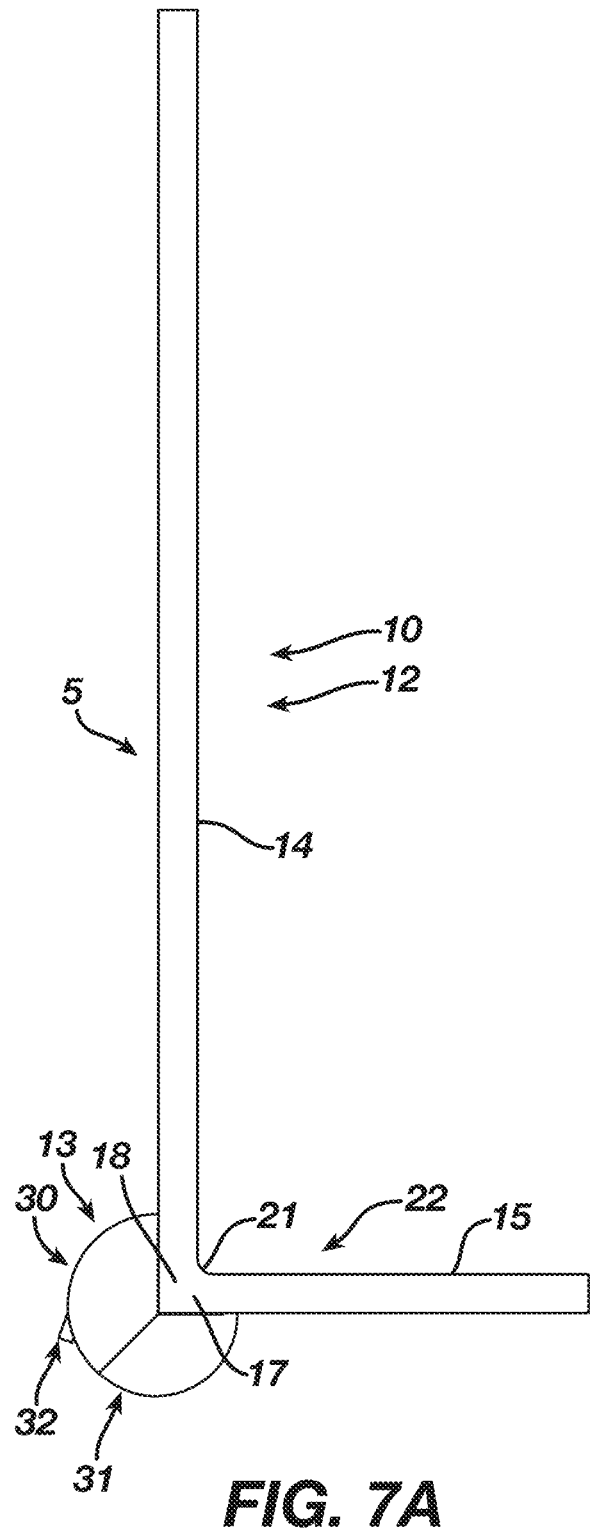
FIG. 7A is a side view illustrating the orthopedic fixation system according to the first embodiment wherein the implant retainer constrains the implant in the insertion shape.
Figure 7B:
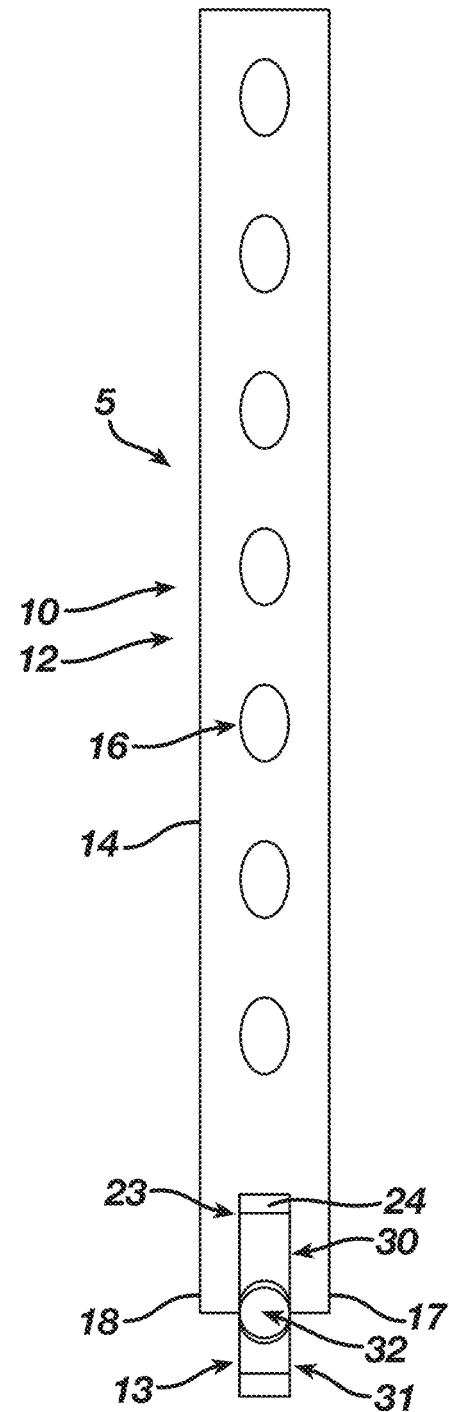
FIG. 7B is a rear view illustrating the orthopedic fixation system according to the first embodiment wherein the implant retainer constrains the implant in the insertion shape.
Figure 7C:
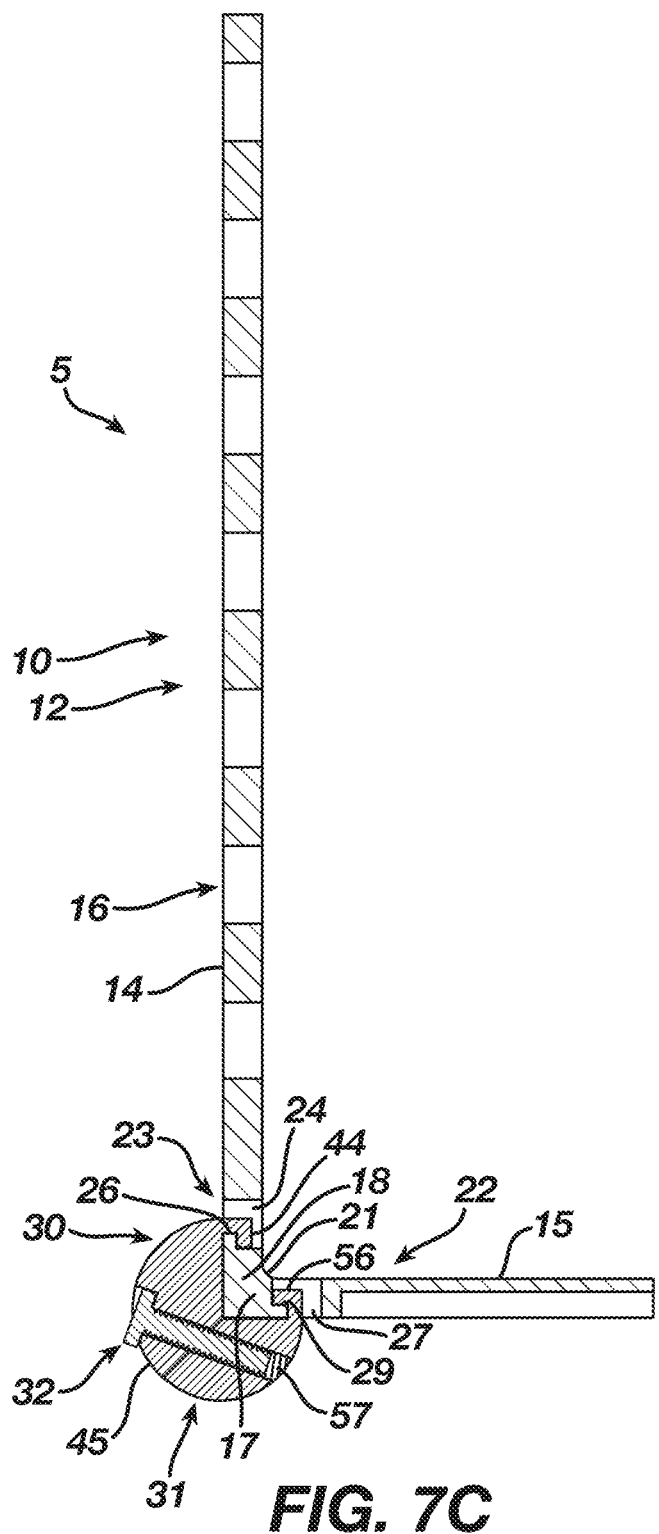
FIG. 7C is a cross-sectional side view illustrating the orthopedic fixation system according to the first embodiment wherein the implant retainer constrains the implant in the insertion shape.

The implant 10 includes a transition section 17 located within the blade segment 15 at a junction 18 of the plate segment 14 and the blade segment 15. The regular inherent shape of the implant 10, as illustrated in FIGS. 1 and 2A-2F, is its natural shape 11 where the transition section 17 locates the blade segment 15 relative to the plate segment 14 at a first angle 19 that provides the implant 10 with a closed profile 20. Nevertheless, as illustrated in FIGS. 3A-3C, the implant 10 is deformable under the action of superelasticity or temperature dependent shape memory to its insertion shape 12 where the transition section 17 deforms to store energy while also moving the blade segment 15 relative to the plate segment 14 from the first angle 19 to a second angle 21 greater than the first angle 19 that provides the implant 10 with an open profile 22. Since the insertion shape 12 is not the regular inherent shape of the implant 10, the blade segment 15 as illustrated in FIGS. 7A-7C typically is mechanically constrained using the implant retainer 13 whereby the implant retainer 13 maintains the blade segment 15 relative to the plate segment 14 at the second angle 21. In particular, the implant retainer 13, as described more fully herein, couples with the plate segment 14 and the blade segment 15 such that the implant retainer 13 holds the blade segment 15 relative to the plate segment 14 at the second angle 21, resulting in the implant retainer 13 constraining the deformed transition section 17 in order to maintain the implant 10 in its insertion shape 12. After implantation into bone, bones, or bone pieces and a release of the implant retainer 13, including, if necessary, a heating of the implant 10, the implant 10 delivers the energy stored in the transition section 17 whereby the blade segment 15 attempts to transition from the second angle 21 to the first angle 19 such that the implant 10 affixes the bone, bones, or bone pieces through an application of a compressive force thereto.

The implant 10, in order to facilitate its engagement by the implant retainer 13, includes a retainer receiver 23 traversing the transition section 17 configured to receive the implant retainer 13 therein. The retainer receiver 23 includes a first securing feature incorporated into the plate segment 14 in the form of an aperture 24 extending through the plate segment 14 whereby the aperture 24 is located within the plate segment 14 adjacent the junction 18. The retainer receiver 23, and thus the plate segment 14, includes a catch 26 protruding into the aperture 24, which, in the first embodiment, is positioned within the aperture 24 adjacent the junction 18. Similarly, the retainer receiver 23 includes a second securing feature incorporated into the blade segment 15 in the form of an aperture 27 extending through the blade segment 15 whereby the aperture 27 is located within the blade segment 15 adjacent the junction 18. The retainer receiver 23, and thus the blade segment 15, includes a catch 29 protruding into the aperture 27, which, in the first embodiment, is positioned within the aperture 27 adjacent the junction 18. The aperture 24 and the catch 26 thereof and the aperture 27 and the catch 29 thereof, as described more fully herein, provide points of engagement for the implant 10 with the implant retainer 13.

Figure 4:
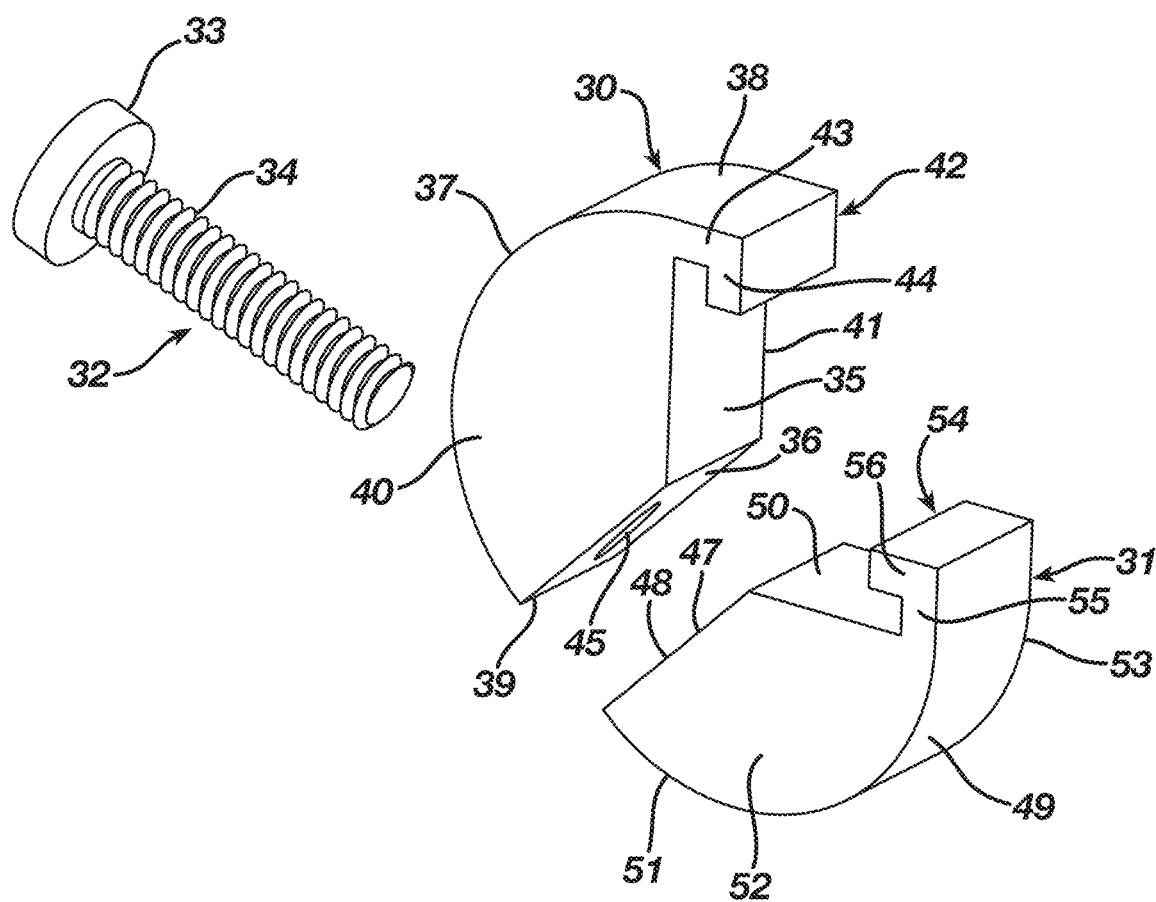
FIG. 4 is a top isometric view illustrating an implant retainer of the orthopedic fixation system according to the first embodiment.
Figure 5A:
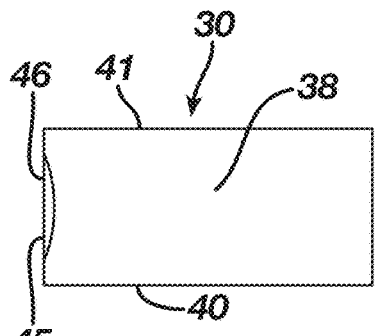
FIG. 5A is a top view illustrating a first retaining member of the implant retainer of the orthopedic fixation system according to the first embodiment.
Figure 5B:
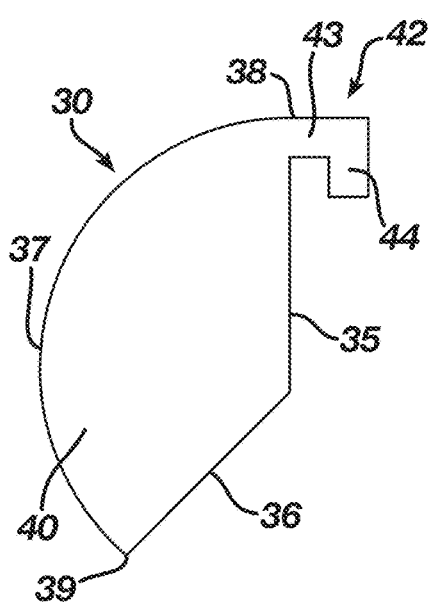
FIG. 5B is a side view illustrating the first retaining member of the implant retainer of the orthopedic fixation system according to the first embodiment.
Figure 5C:
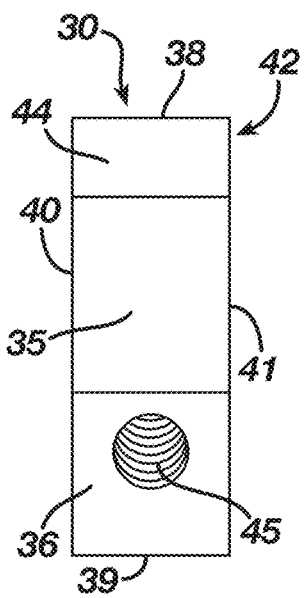
FIG. 5C is a front view illustrating the first retaining member of the implant retainer of the orthopedic fixation system according to the first embodiment.
Figure 5D:
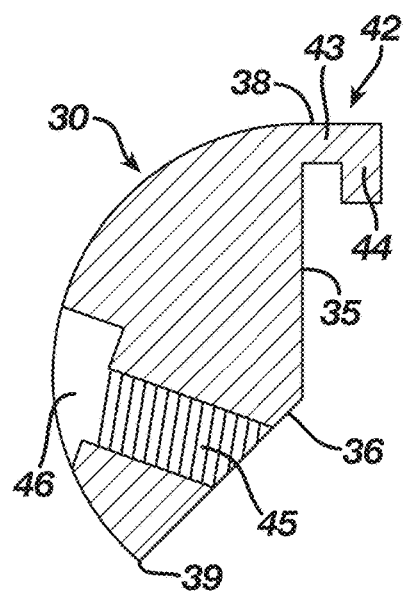
FIG. 5D is a cross-sectional side view illustrating the first retaining member of the implant retainer of the orthopedic fixation system according to the first embodiment.
Figure 5E:
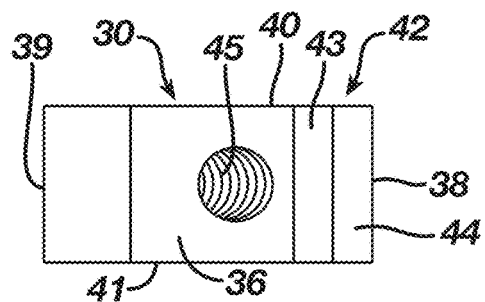
FIG. 5E is a bottom view illustrating the first retaining member of the implant retainer of the orthopedic fixation system according to the first embodiment.
Figure 6A:
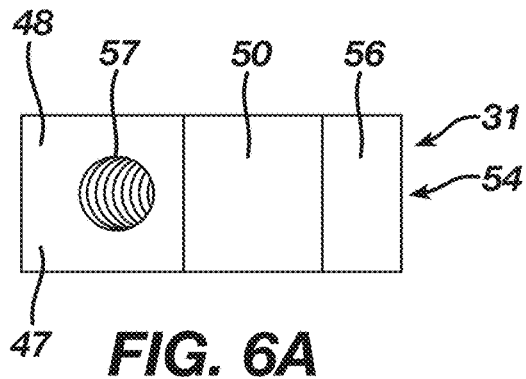
FIG. 6A is a top view illustrating a second retaining member of the implant retainer of the orthopedic fixation system according to the first embodiment.
Figure 6E:
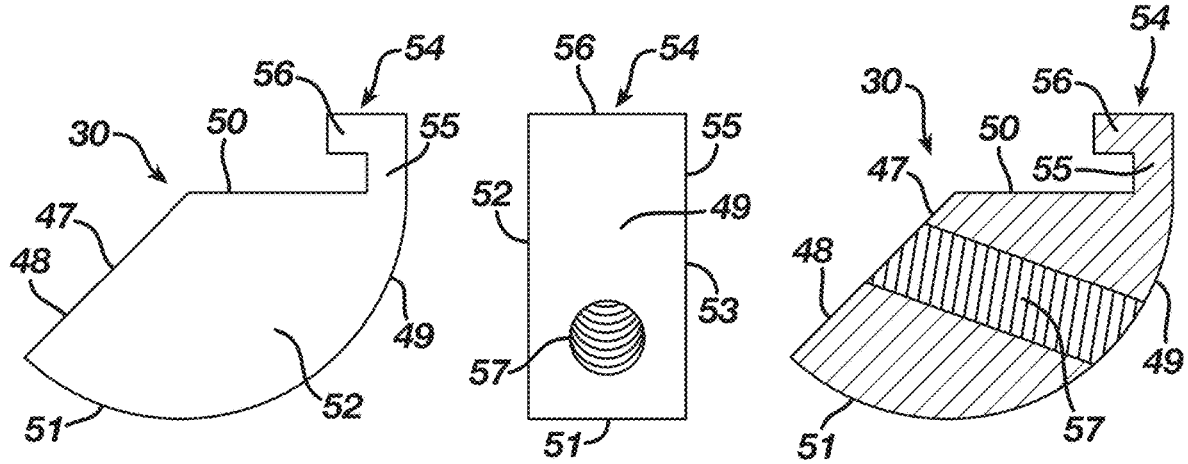
FIG. 6E is a bottom view illustrating the first retaining member of the implant retainer of the orthopedic fixation system according to the first embodiment.
Figure 6E:
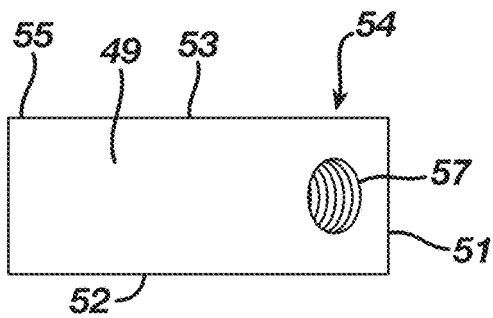

The implant retainer 13 as illustrated in FIG. 4 includes a first retention block 30 and a second retention block 31 configured to engage the implant 10. The implant retainer 13 includes a fastener in the form of a set screw 32 having a head 33 and a shank 34 with threads whereby the set screw 32 is configured to secure the first retention block 30 with the second retention block 31 while the first retention block 30 and the second retention block 31 engage the implant 10.

The first retention block 30 as illustrated in FIGS. 5A-5E preferably is three-dimensional in form including a front 35, a block interface 36, a rear 37, a top 38, a bottom 39, a first side 40, and a second side 41. The first retention block 30 may be manufactured from any suitable rigid material, including but not limited to biocompatible metal or metal alloy, such as, for example, titanium, stainless steel, titanium alloy, and cobalt chrome alloy. The block interface 36 slopes from the front 35 to the bottom 39 in order to facilitate engagement of the first retention block 30 with the second retention block 31. The first retention block 30 includes a fastener 42 engageable with the implant 10 at the aperture 24 of the plate segment 14. More particularly, the fastener 42 and the aperture 24 are configured and correspondingly sized whereby the fastener 42 inserts into the first aperture 24 while bypassing the catch 26 thereof such that the fastener 42 resides below the catch 26 without exiting the aperture 24. The fastener 42 includes a post 43 extending from the front 35 adjacent the top 38 and a detent 44 extending from the post 43 toward the block interface 36. The first retention block 30 includes a bore 45 extending therethrough along a pathway from the rear 37 to the block interface 36. The bore 45, due to the pathway thereof that angles from the rear 37 to the block interface 36, is configured to engage the set screw 32 thereby securing the set screw 32 with the first retention block 30 while allowing the set screw 32 to extend from the first retention block 30 at the block interface 36 for securing with the second retention block 31. The bore 45 includes a countersink 46 configured to receive therein the head 33 of the set screw 32 such that the head 33 resides below the rear 37 of the first retention block 30. The bore 45 between the countersink 46 and the block interface 36 includes threads that correspond with the threads on the shaft 34 of the set screw 32 such that the bore 45 engages with the set screw 32.

The second retention block 31 as illustrated in FIGS. 6A-6E preferably is three-dimensional in form including a front 47 defining a block interface 48, a rear 49, a top 50, a bottom 51, a first side 52, and a second side 53. The second retention block 31 may be manufactured from any suitable rigid material, including but not limited to biocompatible metal or metal alloy, such as, for example, titanium, stainless steel, titanium alloy, and cobalt chrome alloy. The front 47 along the block interface 48 slopes from the top 50 to the bottom 51 in order to facilitate engagement of the second retention block 31 with the first retention block 30. The second retention block 31 includes a fastener 54 engageable with the implant 10 at the aperture 27 of the blade segment 15. More particularly, the fastener 54 and the aperture 27 are configured and correspondingly sized whereby the fastener 54 inserts into the aperture 27 while bypassing the catch 29 thereof such that the fastener 54 resides below the catch 29 without exiting the aperture 27. The fastener 54 includes a post 55 extending from the top 50 adjacent the rear 49 and a detent 56 extending from the post 55 toward the block interface 48. The second retention block 31 includes a bore 57 extending therethrough along a pathway from the block interface 48 toward the rear 49 and the bottom 51. The bore 57, due to the pathway thereof that angles from the block interface 48 toward the bottom 51 correspondingly with the pathway of the bore 45, is configured to align with the bore 45 of the first retention block 30 when the block interface 36 of the first retention block 30 aligns with the block interface 48 of the second retention block 31. In accordance therewith, the bore 57, when the set screw 32 extends from the first retention block 30 at the block interface 36, engages with the set screw 32 thereby securing the set screw 32 with the second retention block 31 and further the first retention block 30 with the second retention block 31. The bore 57 includes threads that correspond with the threads on the shaft 34 of the set screw 32 such that the bore 57 engages with the set screw 32.

Forming the orthopedic fixation system 5 includes mechanically deforming the implant 10 from the natural shape 11 to the insertion shape 12. More particularly, the implant 10 via the transition section 17 mechanically deforms to store energy while also moving the blade segment 15 relative to the plate segment 14 from the first angle 19 to the second angle 21 that provides the implant 10 with the open profile 22. Mechanical deformation of the implant 10 may include cooling of the implant 10 whereby the implant 10 transitions from its austenite phase to its martensite phase in order to facilitate an easier mechanical deformation of the implant 10 from the natural shape 11 to the insertion shape 12 prior to an engagement of the implant retainer 13 with the implant 10.

After mechanical deformation of the implant 10 from the natural shape 11 to the insertion shape 12, the first retention block 30 is oriented relative to the plate segment 14 of the implant 10 with the front 35 facing the plate segment 14 at the junction 18 and the fastener 42 aligned with the aperture 24 in a bypass position where the fastener 42 upon insertion into the aperture 24 will bypass the catch 26. The first retention block 30 then is moved towards the plate segment 14 until the front 35 abuts the plate segment 14, resulting in the fastener 42 inserting into the aperture 24 and bypassing the catch 26 such that the fastener 42 and thus the detent 44 thereof reside above the catch 26. After insertion of the fastener 42 into the aperture 24, the first retention block 30 slides towards the junction 18 of the plate segment 14 and the blade segment 15 until the fastener 42 at the detent 44 interlocks with the catch 26, resulting in the first retention block 30 engaging the plate segment 14 at the junction 18. The engagement of the first retention block 30 with the plate segment 14 locates the block interface 36 at the junction 18 of the plate segment 14 and the blade segment 15.

Similarly, the second retention block 31 is oriented relative to the blade segment 15 of the implant 10 with the top 50 facing the blade segment 15 at the junction 18 and the fastener 54 aligned with the aperture 27 in a bypass position where the fastener 54 upon insertion into the aperture 27 will bypass the catch 29. The second retention block 31 then is moved towards the blade segment 15 until the top 50 abuts the blade segment 15, resulting in the fastener 54 inserting into the aperture 27 and bypassing the catch 29 such that the fastener 54 and thus the detent 56 thereof reside above the catch 29. After insertion of the fastener 54 into the aperture 27, the second retention block 31 slides towards the junction 18 of the plate segment 14 and the blade segment 15 until the fastener 54 at the detent 56 interlocks with the catch 29, resulting in the second retention block 31 engaging the blade segment 15 at the junction 18. The engagement of the second retention block 31 with the blade segment 15 locates the block interface 48 at the junction 18 of the plate segment 14 and the blade segment 15.

The engagements of the first and second retention blocks 30 and 31 respectively with the plate segment 14 and the blade segment 15 and the location of the block interfaces 36 and 48 at the junction 18 of the plate segment 14 and the blade segment 15 places the block interface 36 next to the block interface 48 with the bore 45 in alignment with the bore 57. Upon alignment of the bores 45 and 57, the set screw 32 inserts into the bores 45 and 57 whereupon the shaft 34 extends through the bore 45 and into the bore 57 and the head 33 resides in the countersink 46. The set screw 32 therefore connects the first retention block 30 and the second retention block 31 such that the connected first and second retention blocks 30 and 31 span the transition section 17 of the implant 10 while also respectively engaging the catches 26 and 29 with the fasteners 42 and 54 thereof. In accordance therewith, the implant retainer 13, on account of the connected first and second retention blocks 30 and 31 concurrently spanning the transition section 17 and respectively holding the implant 10 at the catches 26 and 29 with the fasteners 42 and 54 thereof, constrains the implant 10 in the insertion shape 12 thereby preventing the implant 10 from returning to the natural shape 11.

Figure 8A:
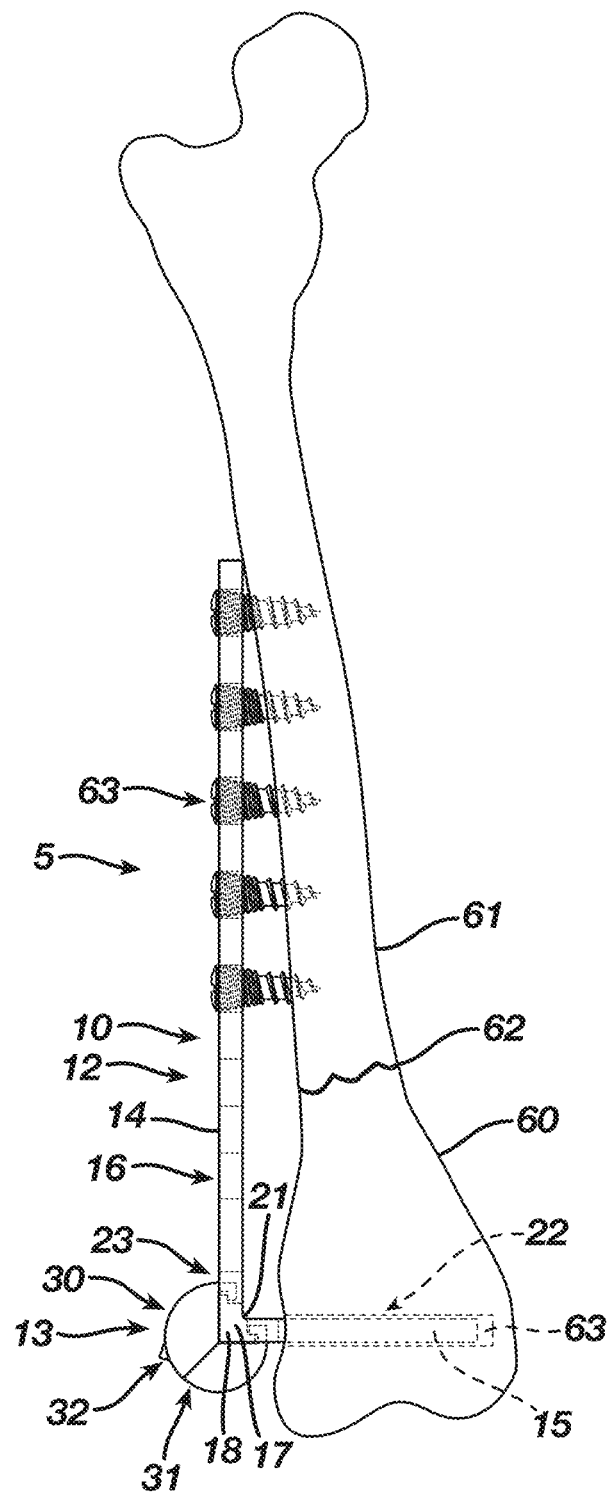
FIG. 8A is a side view illustrating implantation of the orthopedic fixation system according to the first embodiment wherein the implant retainer constrains the implant in the insertion shape.
Figure 8B:
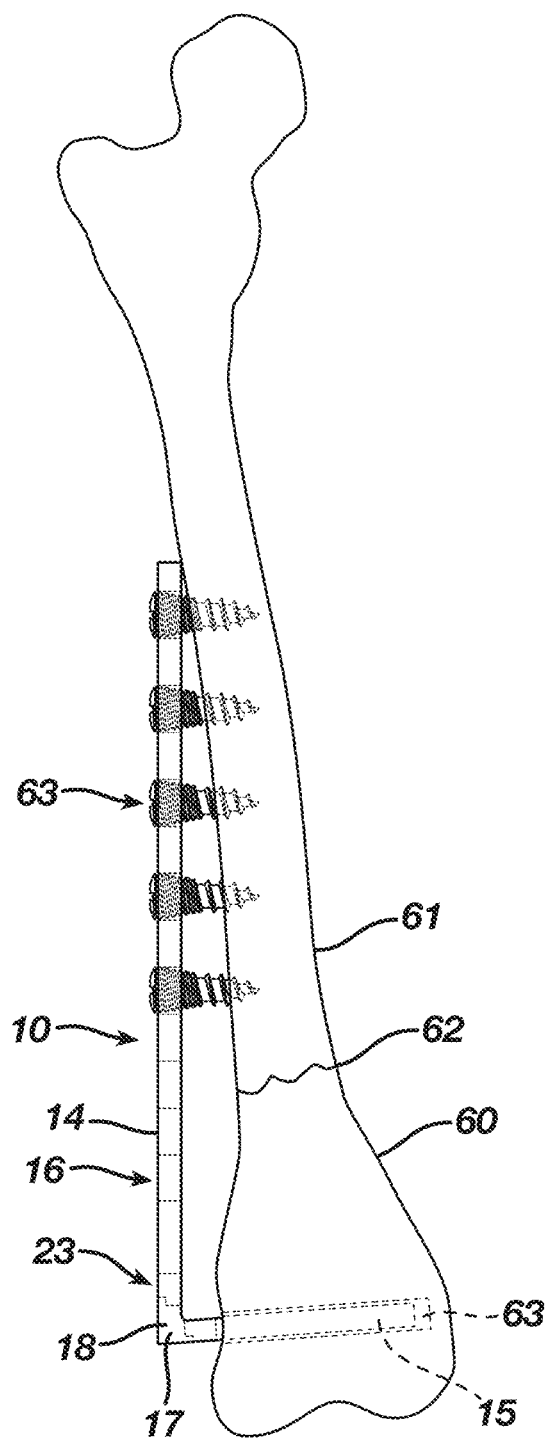
FIG. 8B is a side view illustrating implantation of the orthopedic fixation system according to the first embodiment wherein removal of the implant retainer releases the implant for attempted transition from the insertion shape to the natural shape.
Figure 9:
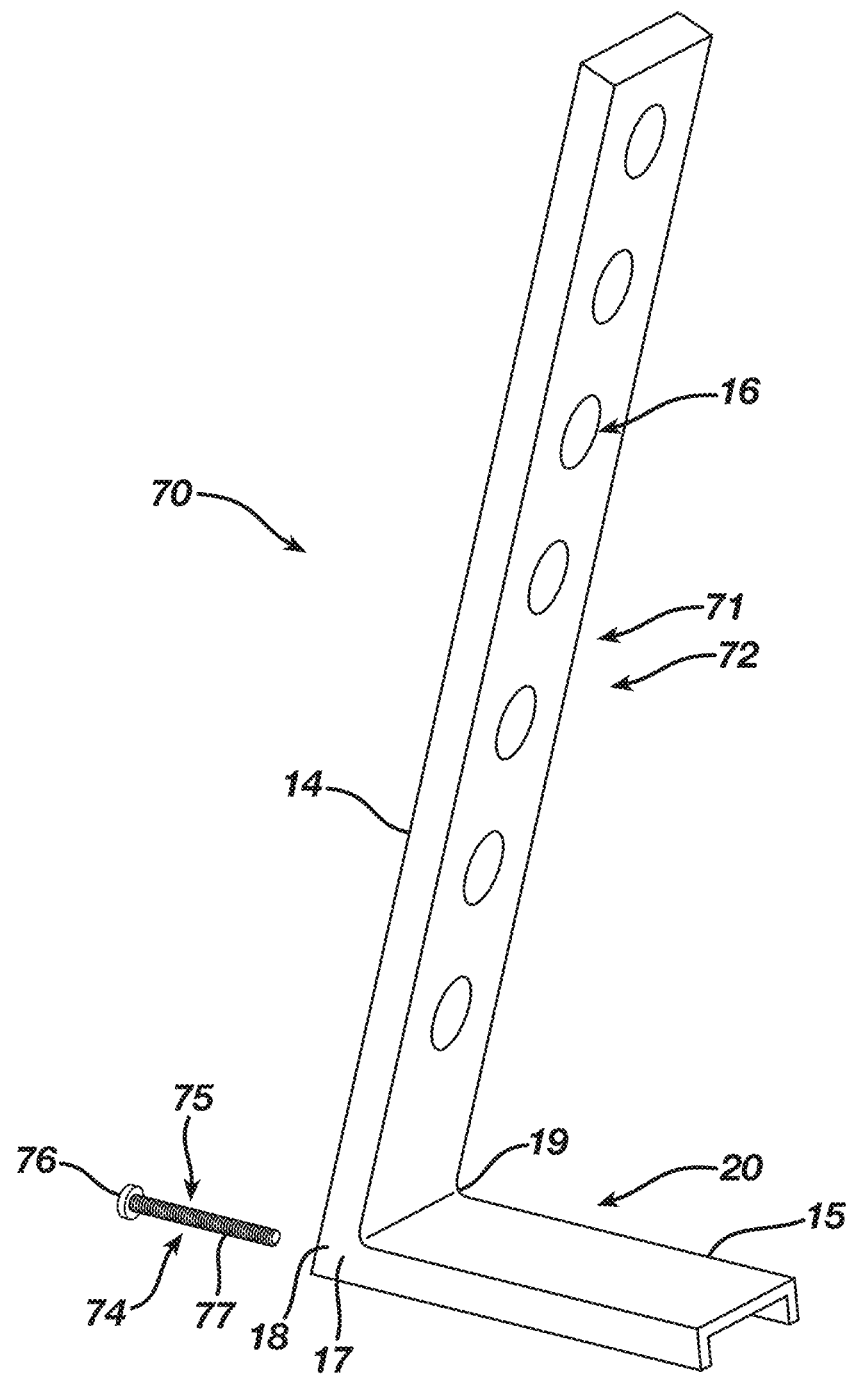
FIG. 9 is a top isometric view illustrating an orthopedic fixation system according to a second embodiment.
Figure 10A:
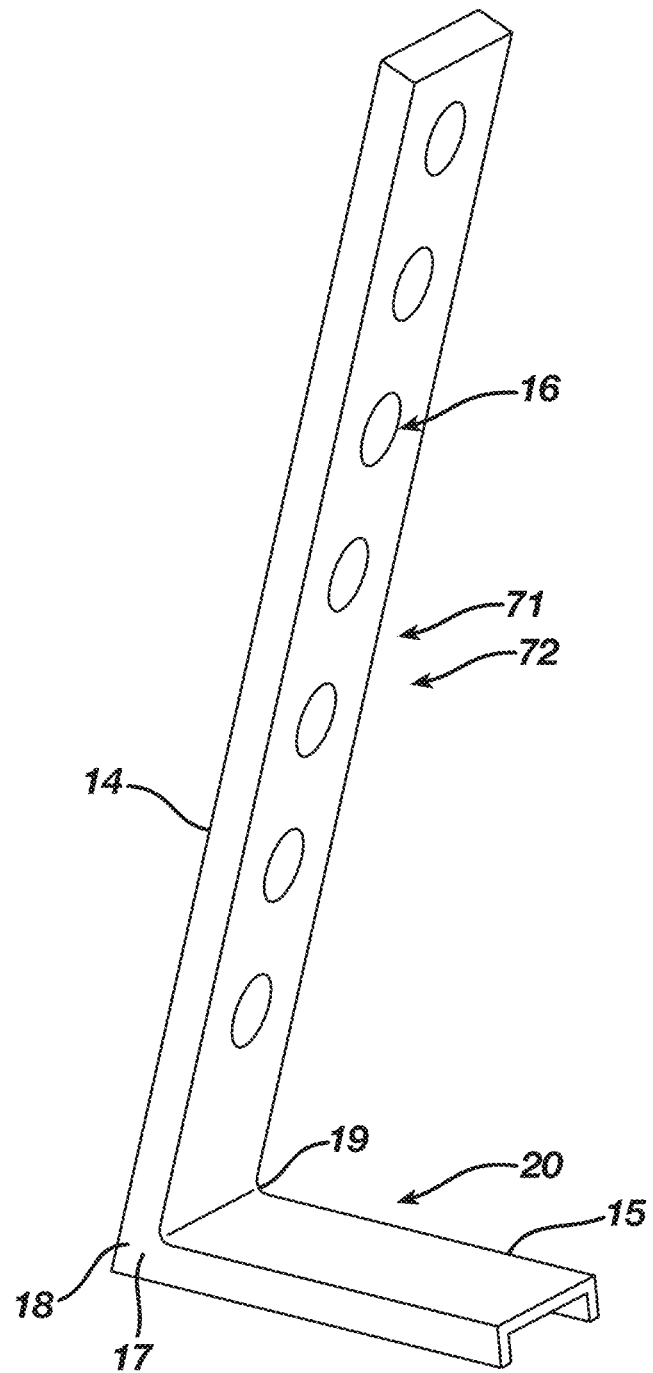
FIG. 10A is a top isometric view illustrating an implant of the orthopedic fixation system according to the second embodiment in a natural shape.
Figure 10B:
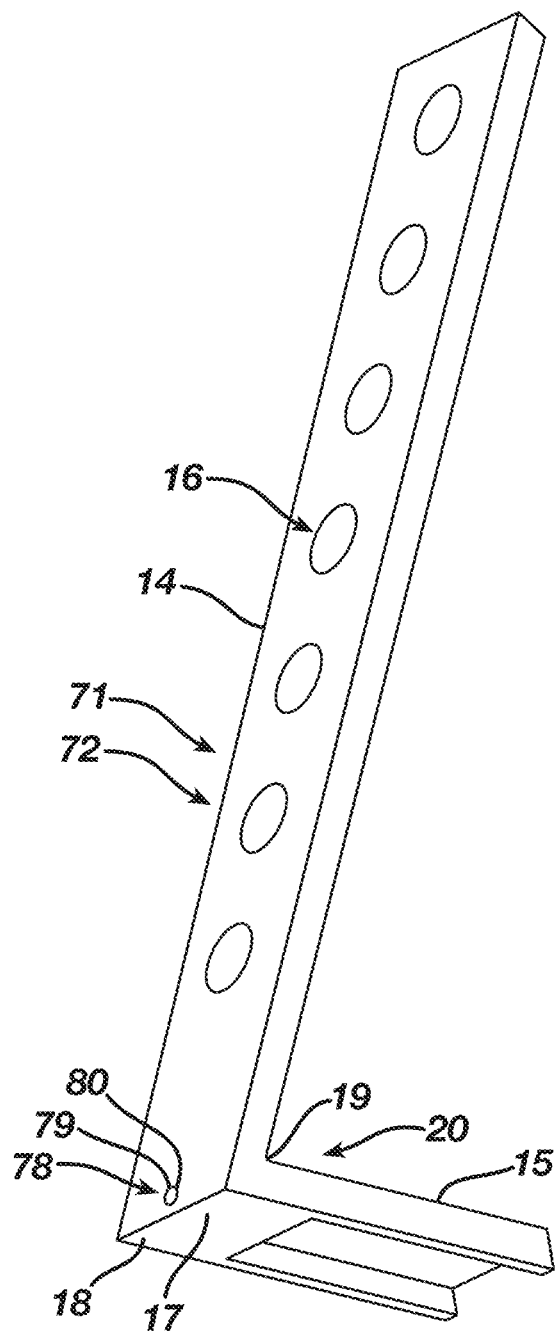
FIG. 10B is a bottom isometric view illustrating the implant of the orthopedic fixation system according to the second embodiment in the natural shape.
Figure 10C:
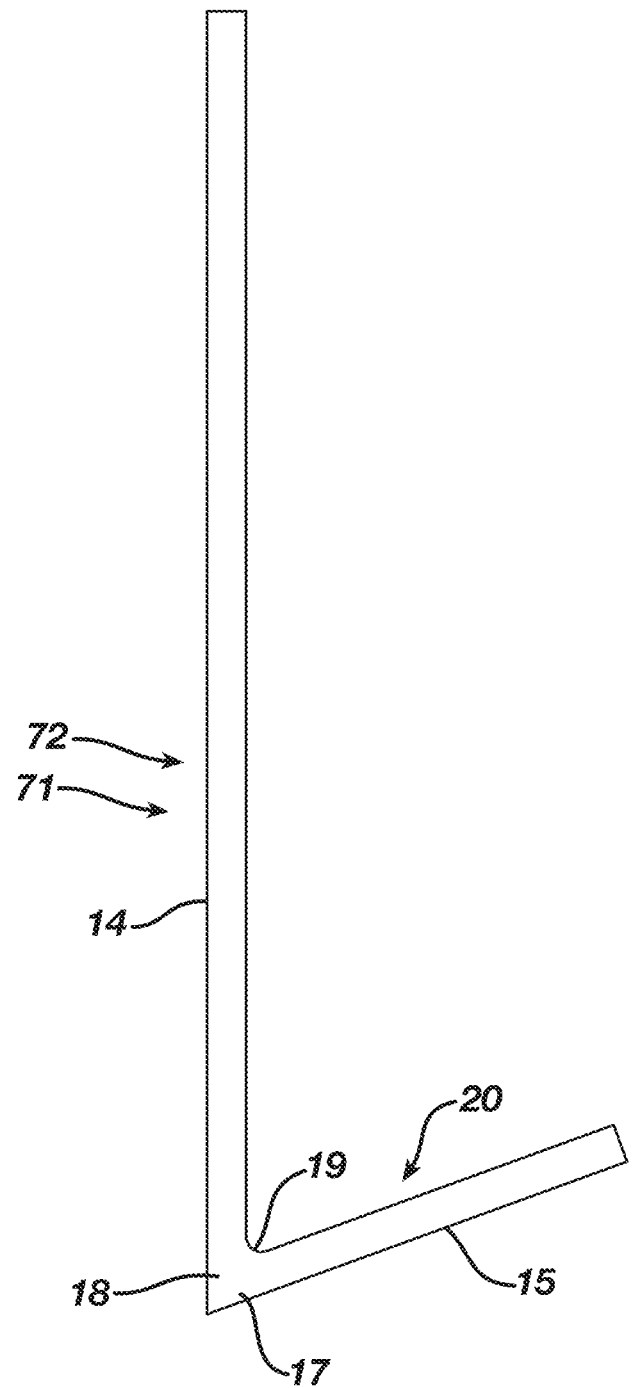
FIG. 10C is a side view illustrating the implant of the orthopedic fixation system according to the second embodiment in the natural shape.
Figure 10D:
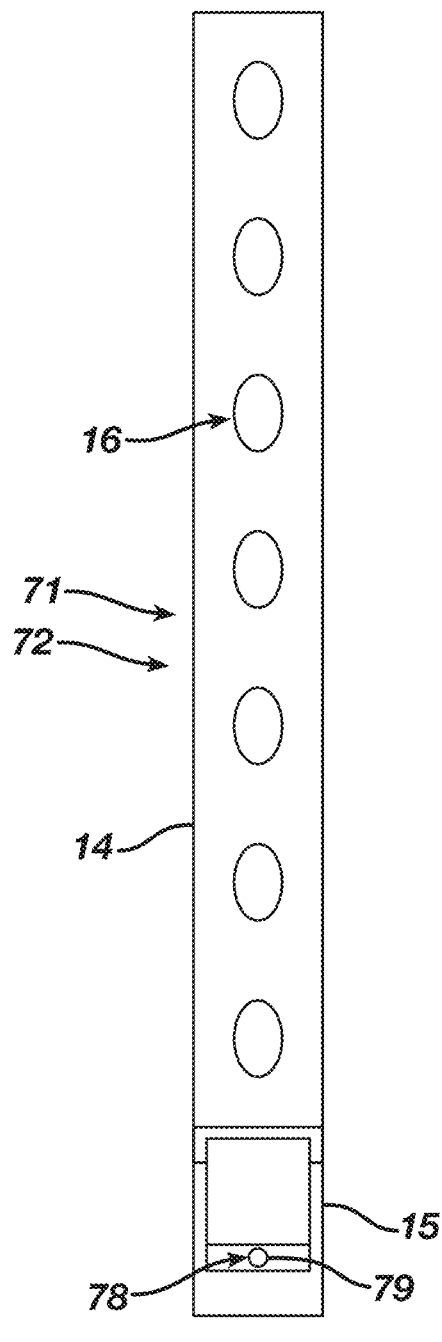
FIG. 10D is a front view illustrating the implant of the orthopedic fixation system according to the second embodiment in the natural shape.
Figure 10E:
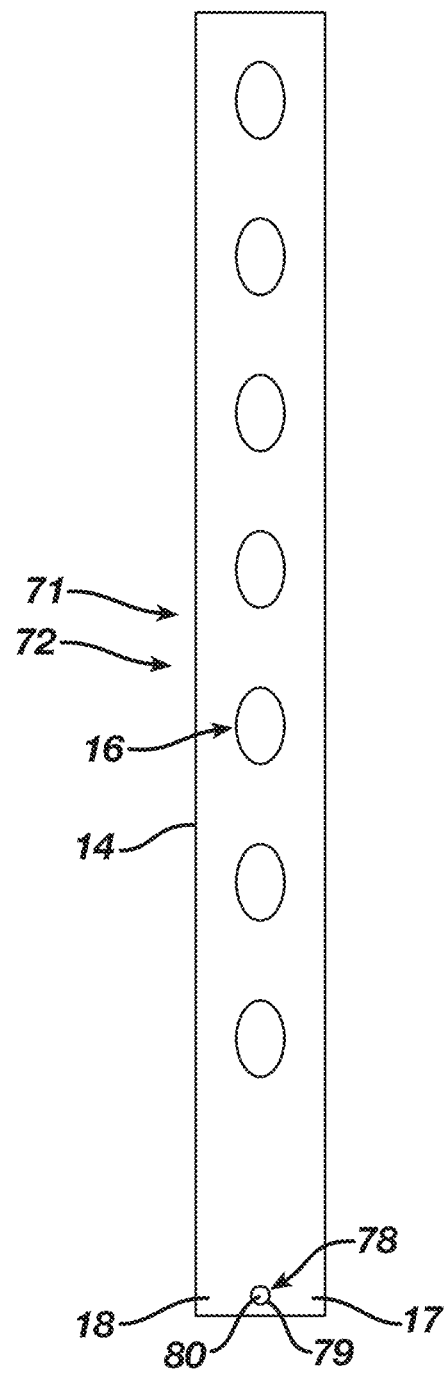
FIG. 10E is a rear view illustrating the implant of the orthopedic fixation system according to the first embodiment in the natural shape.
Figure 10F:
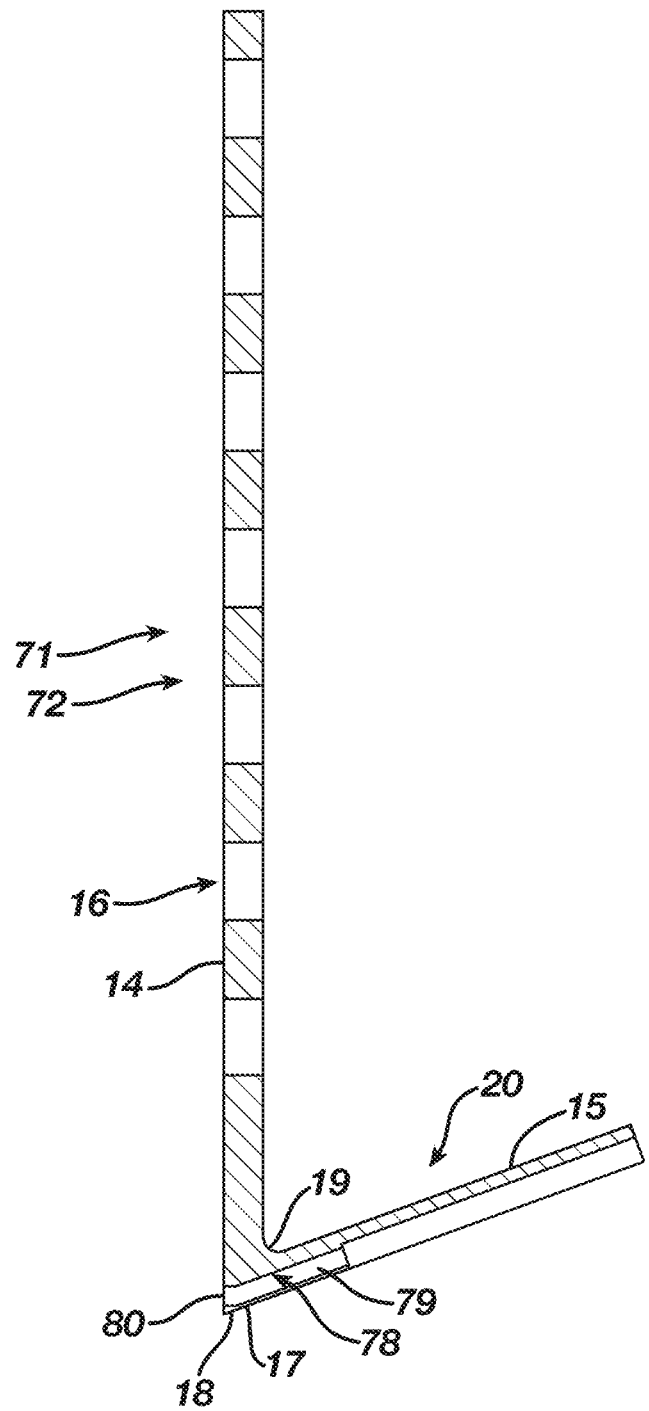
FIG. 10F is a cross-sectional side view illustrating the implant of the orthopedic fixation system according to the second embodiment in the natural shape.

In accordance with the orthopedic fixation system 5, the implant retainer 13, when engaged with the implant 10 as previously described, retains the implant 10 in the insertion shape 12 such that the implant 10 is ready for securing with bone, bones, or bone pieces, and, in particular, as illustrated in FIGS. 8A and 8B, with a first bone 60 and a second bone 61, which are presented herein as an example. A surgeon aligns the first bone 60 with the second bone 61 at a fixation zone 62 in an orientation that promotes fixation of the first bone 60 with the second bone 61 and a proper healing thereof. The surgeon forms a channel 63 in the first bone 60 configured to receive the blade segment 15 of the implant 10 therein. The surgeon then inserts the blade segment 15 of the implant 10 into the channel 63 with the plate segment 14 spanning the fixation zone 62 from the first bone 60 to the second bone 61. With the blade segment 15 implanted in the channel 63 and the plate segment 14 traversing the first and second bones 60 and 61, the surgeon secures the plate segment 14 with the second bone 61 using one or more fixation devices, such as bone screws 63, inserted through the one or more openings 16 and into the second bone 61 The surgeon, if necessary, can form one or more drill holes in the second bone 61 to assist in the insertion of the one or more bone screws 63 into the second bone 61. The implanting of the blade segment 15 into the first bone 60 in combination with the securing of the plate segment 14 to the second bone 61 affixes the implant 10 with the first and second bones 60 and 61 across the fixation zone 62.

In view of the implant 10 being affixed with the first and second bones 60 and 61 across the fixation zone 62, the surgeon removes the implant retainer 13 from the implant 10. More particularly, the surgeon removes the set screw 32 from the bores 45 and 57 of the first and second retention blocks 30 and 31 thereby disconnecting the first retention block 30 from the second retention block 31. Upon disconnection, the surgeon separates the first and second retention blocks 30 and 31, resulting in the fasteners 42 and 54, respectively, at the detents 44 and 56 thereof moving out of abutting relationship with the catches 26 and 29. The surgeon removes the second retention block 31 from the blade segment 15 of the implant 10 and thus the fastener 54 from within the second aperture 27. Likewise, the surgeon removes the first retention block 30 from the plate segment 14 of the implant 10 and thus the fastener 42 from within the first aperture 24. Upon the removal of the implant retainer 13 from the implant receiver 23 of the implant 10, the implant 10 attempts transition from the insertion shape 12 to the natural shape 11 whereby the implant 10 delivers the energy stored in the transition section 17 to the first bone 60, resulting in the implant 10 affixing the first bone 60 and the second bone 61 through an application of a compressive force to the fixation zone 62. The implant retainer 13 accordingly improves implantation of the implant 10 because the implant retainer 13 does not release its constraint of the implant 10 until the implant 10 is affixed to the first and second bones 60 and 61 across the fixation zone 62 thereof such that the implant retainer 13 prevents the implant 10 from prematurely delivering the energy stored therein to the first and second bones 60 and 61 at the fixation zone 62 thereof.

An orthopedic fixation system 70 according to a second embodiment as illustrated in FIGS. 9 and 12A-12C includes an implant 71 transitionable between a natural shape 72 and an insertion shape 73. The orthopedic fixation system 70 further includes an implant retainer 74 configured to engage the implant 71 and constrain the implant 71 in the insertion shape 73. The implant retainer 74 comprises a set screw 75 including a head 76 and a shank 77. The shank 77 may be smooth or preferably include threads that facilitate a more secure coupling of the implant retainer 74 with the implant 71.

Figure 11C:
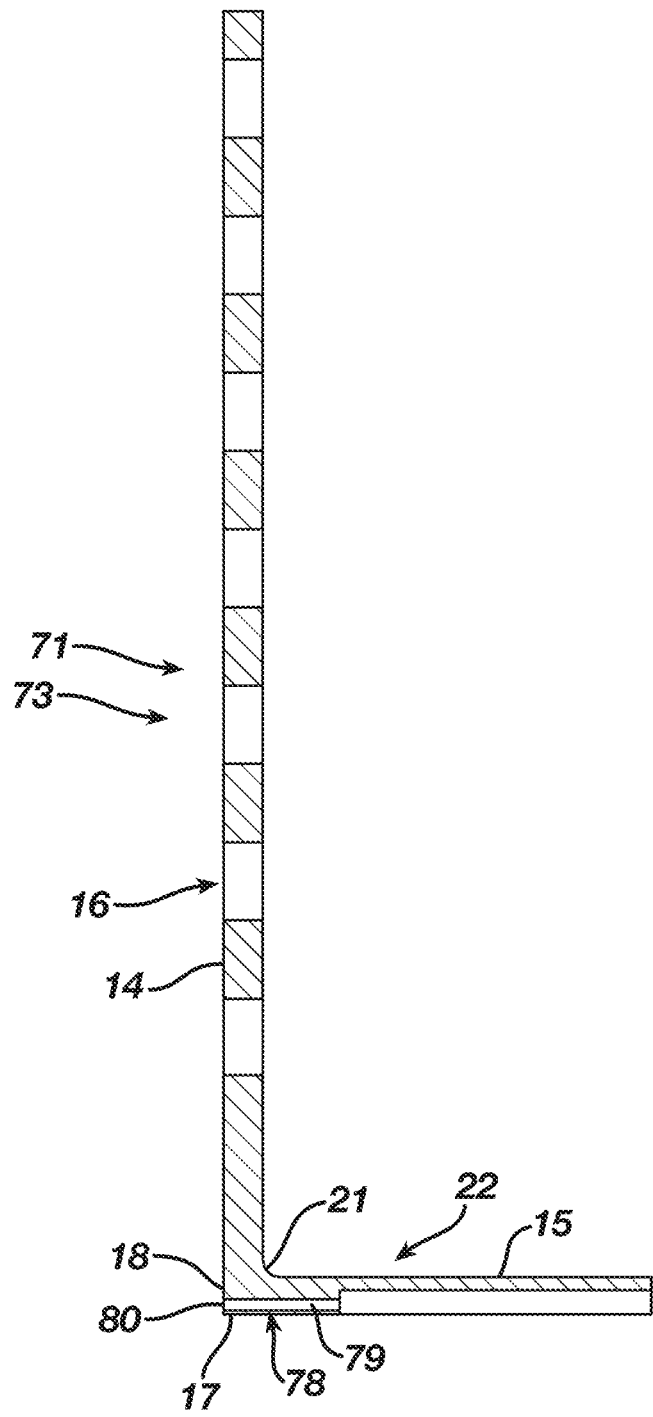
FIG. 11C is a cross-sectional side view illustrating the implant of the orthopedic fixation system according to the second embodiment in the insertion shape.
Figure 12A:
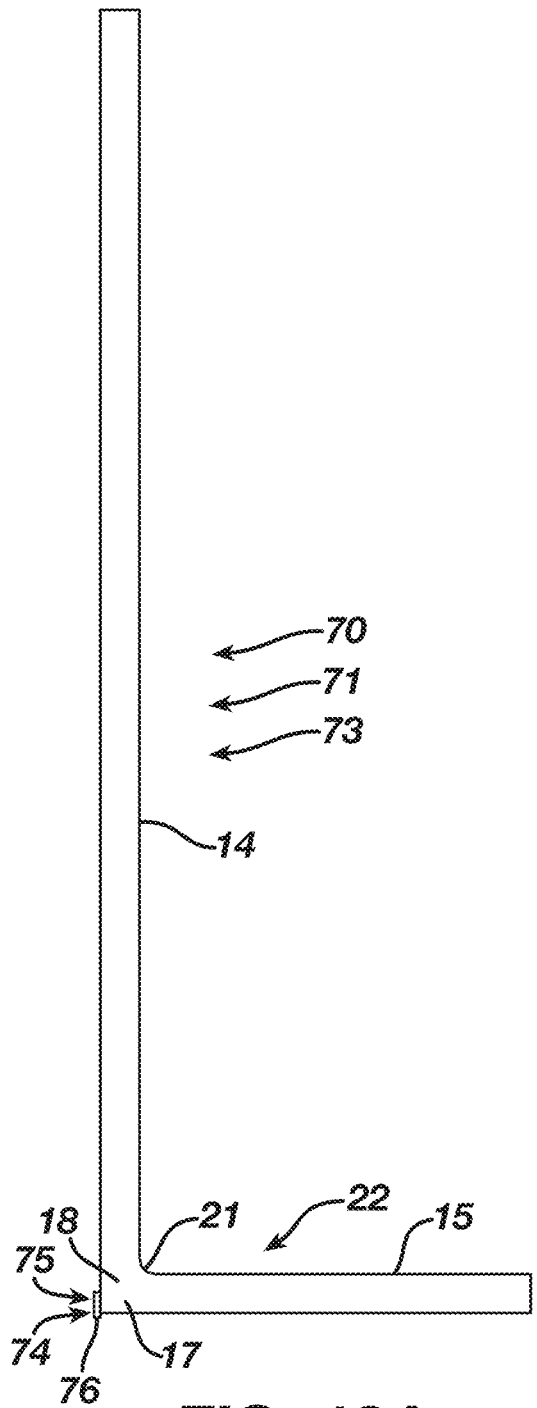
FIG. 12A is a side view illustrating the orthopedic fixation system according to the second embodiment wherein an implant retainer constrains the implant in the insertion shape.
Figure 12B:
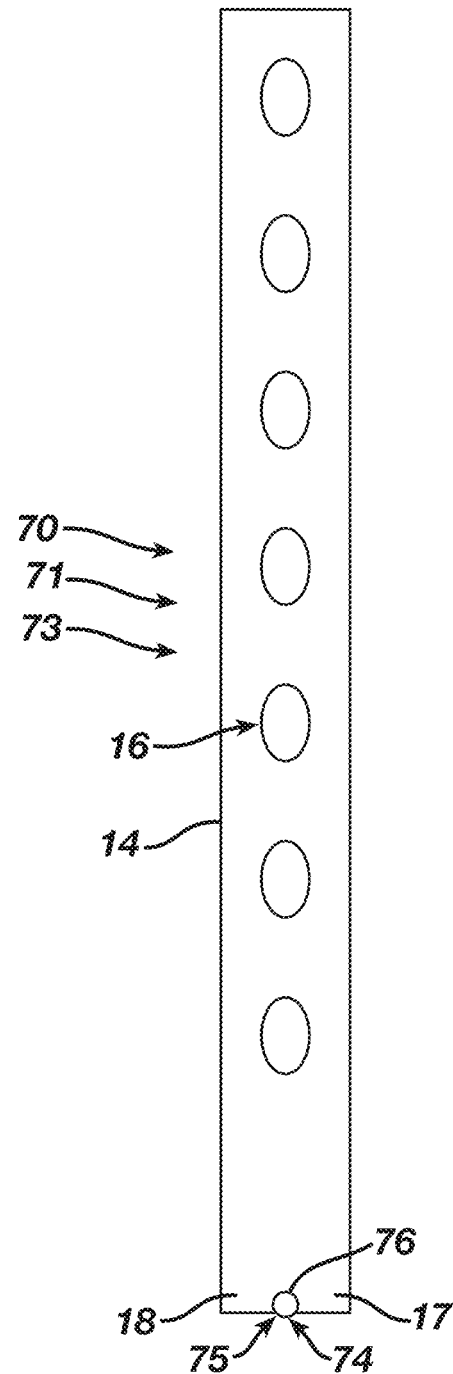
FIG. 12B is a rear view illustrating the orthopedic fixation system according to the second embodiment wherein the implant retainer constrains the implant in the insertion shape.
Figure 12C:
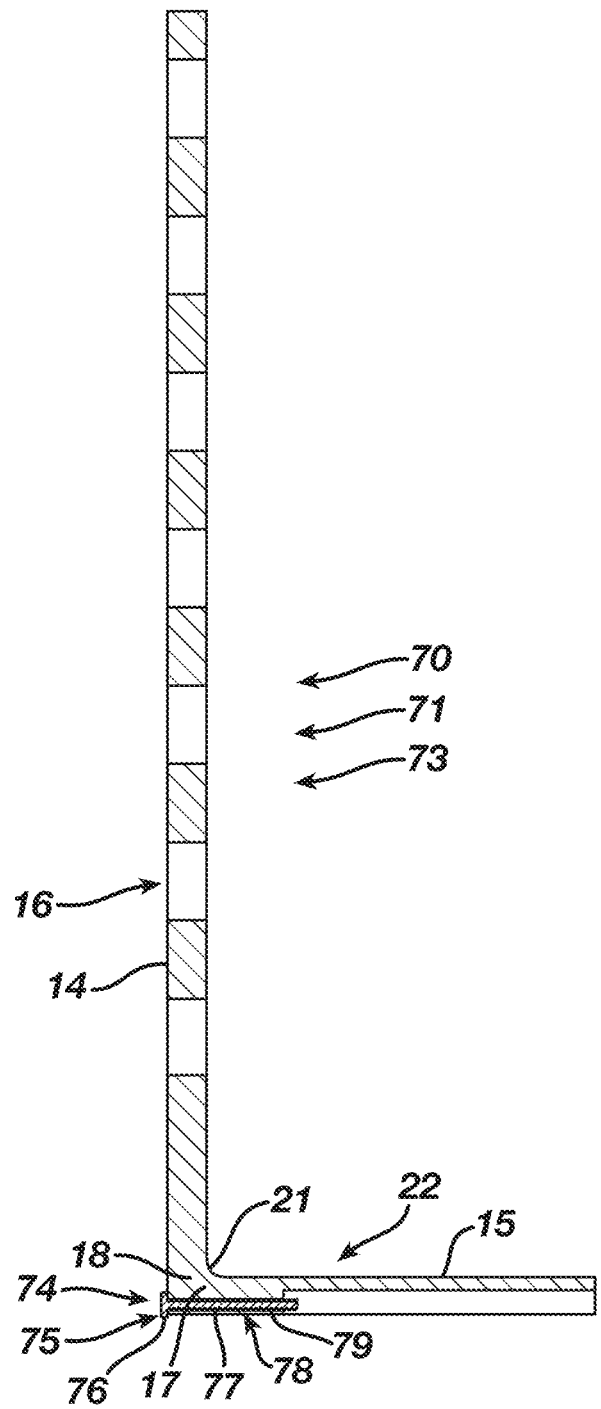
FIG. 12C is a cross-sectional side view illustrating the orthopedic fixation system according to the second embodiment wherein the implant retainer constrains the implant in the insertion shape.

FIGS. 9 and 10A-10F illustrate the implant 71 in the natural shape 72, whereas FIGS. 11A-11C illustrate the implant 71 in the insertion shape 73. The implant 71 is substantially similar in design and operation relative to the implant 10 of the orthopedic fixation system 5 according to the first embodiment such that, for the sake of brevity, only differences therebetween will be described herein. Moreover, one of ordinary skill in the art will recognize that like parts of the implant 71 labeled with like numerals of the implant 10 incorporate a design and function as previously set forth in the detailed description of the implant 10 of the orthopedic fixation system 5 according to the first embodiment.

The implant 71, in order to facilitate its engagement by the implant retainer 74, includes a retainer receiver 78 traversing the transition section 17 configured to receive the implant retainer 74 therein. The retainer receiver 78 includes a securing feature in the form of a bore 79 traversing the transition section 17 located within the blade segment 15 at the junction 18 of the plate segment 14 and the blade segment 15. The bore 79 begins in an entrance 80 located within the plate segment 14 at the junction 18 of the plate segment 14 and the blade segment 15. The bore 79 traverses the junction 18 and further extends into and preferably through the blade segment 15 such that the bore 79 traverses the transition section 17. The bore 79, as described more fully herein, provides a point of engagement for the implant 71 with the implant retainer 74. The bore 79 may be smooth or preferably include threads that facilitate a more secure coupling of the set screw 75 with the implant 71.

Forming the orthopedic fixation system 70 includes mechanically deforming the implant 71 from the natural shape 72 to the insertion shape 73. More particularly, the implant 71 via the transition section 17 mechanically deforms to store energy while also moving the blade segment 15 relative to the plate segment 14 from the first angle 19 to the second angle 21 that provides the implant 71 with the open profile 22. Mechanical deformation of the implant 71 may include cooling of the implant 71 whereby the implant 71 transitions from its austenite phase to its martensite phase in order to facilitate an easier mechanical deformation of the implant 71 from the natural shape 72 to the insertion shape 73 prior to an engagement of the implant retainer 74 with the implant 71.

After mechanical deformation of the implant 71 from the natural shape 72 to the insertion shape 73, the set screw 75 at the shank 77 is aligned with the bore 79 with the shank 77 positioned at the opening 80 into the bore 79. The set screw 75 at the shank 77 is inserted into the bore 79 until the head 76 abuts the plate segment 14 at the opening 80, resulting in the set screw 75 at the shank 77 seating within the bore 79 with the shank 77 traversing the transition section 17. The set screw 75, when the bore 79 and thus the shank 77 of the set screw 75 are smooth, slides within the bore 79. Alternatively, the set screw 75, when the bore 79 and thus the shank 77 of the set screw 75 include threads, screws within the bore 79 using a driver device engaged with the set screw 75 at the head 76 thereof. The set screw 75 with the head 76 abutting the plate segment 14 at the junction 18 and the shank 77 inserted within the bore 79 spans the transition section 17 of the implant 71. In accordance therewith, the implant retainer 74, on account of the inserted set screw 75 spanning the transition section 17, constrains the implant 71 in the insertion shape 73 thereby preventing the implant 71 from returning to the natural shape 72.

Figure 13A:
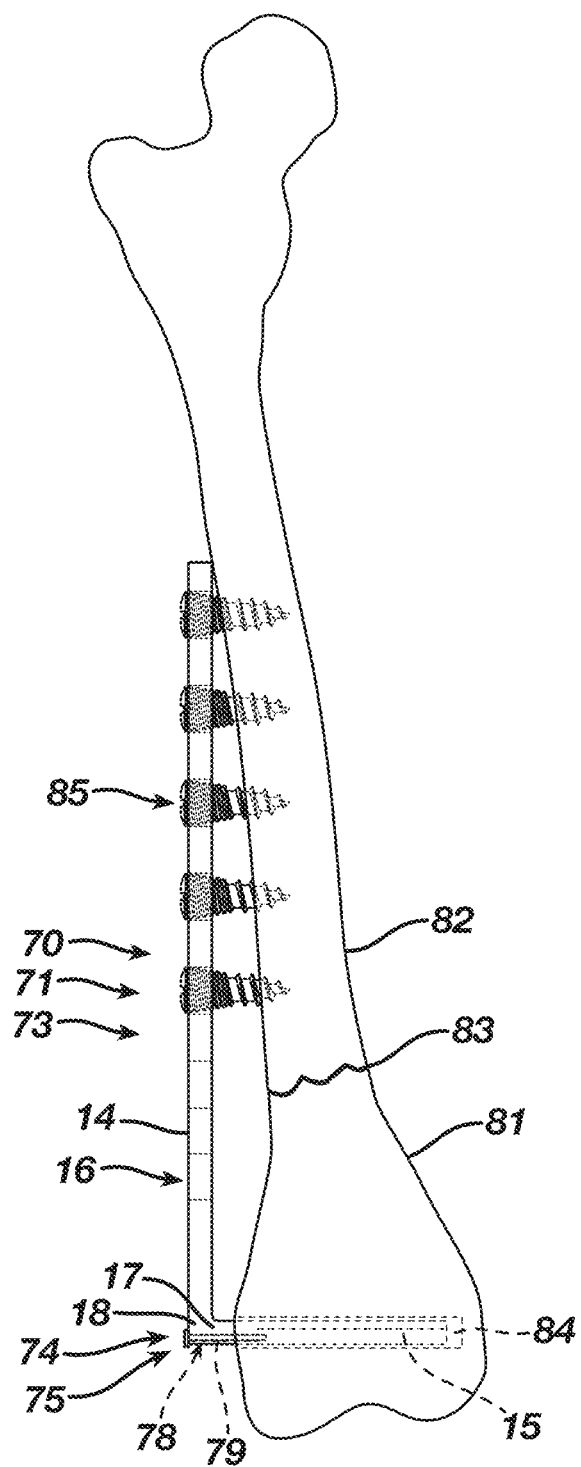
FIG. 13A is a side view illustrating implantation of the orthopedic fixation system according to the second embodiment wherein the implant retainer constrains the implant in the insertion shape.
Figure 13B:
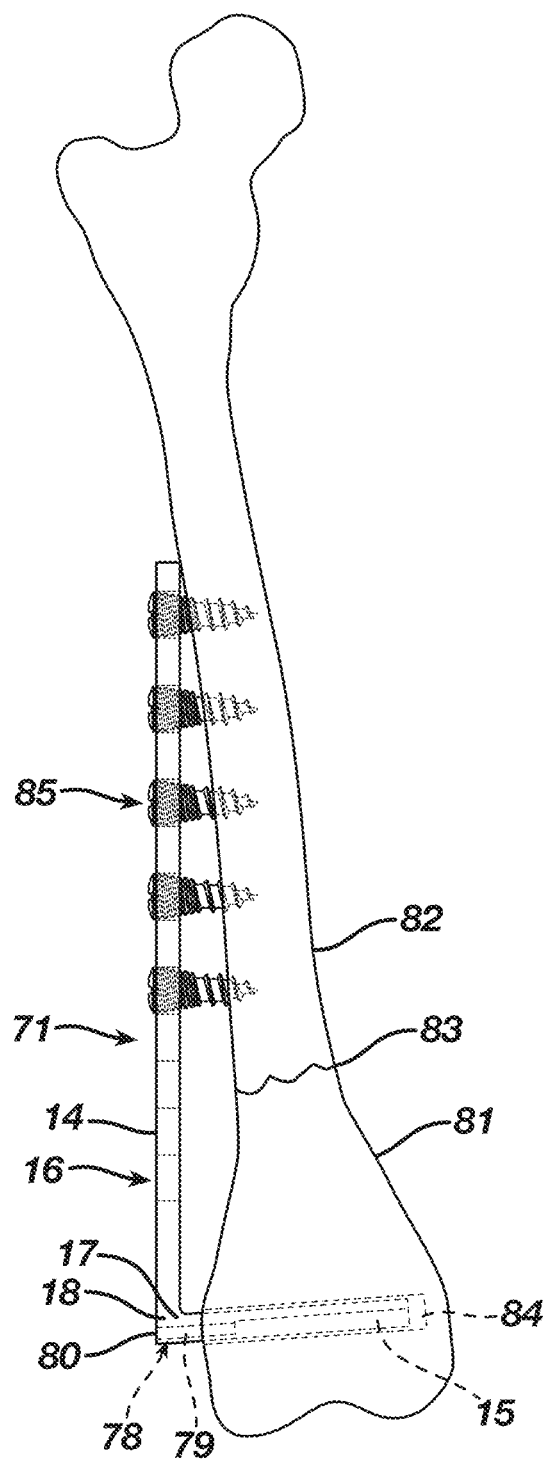
FIG. 13B is a side view illustrating implantation of the orthopedic fixation system according to the second embodiment wherein removal of the implant retainer releases the implant for attempted transition from the insertion shape to the natural shape.
Figure 14:
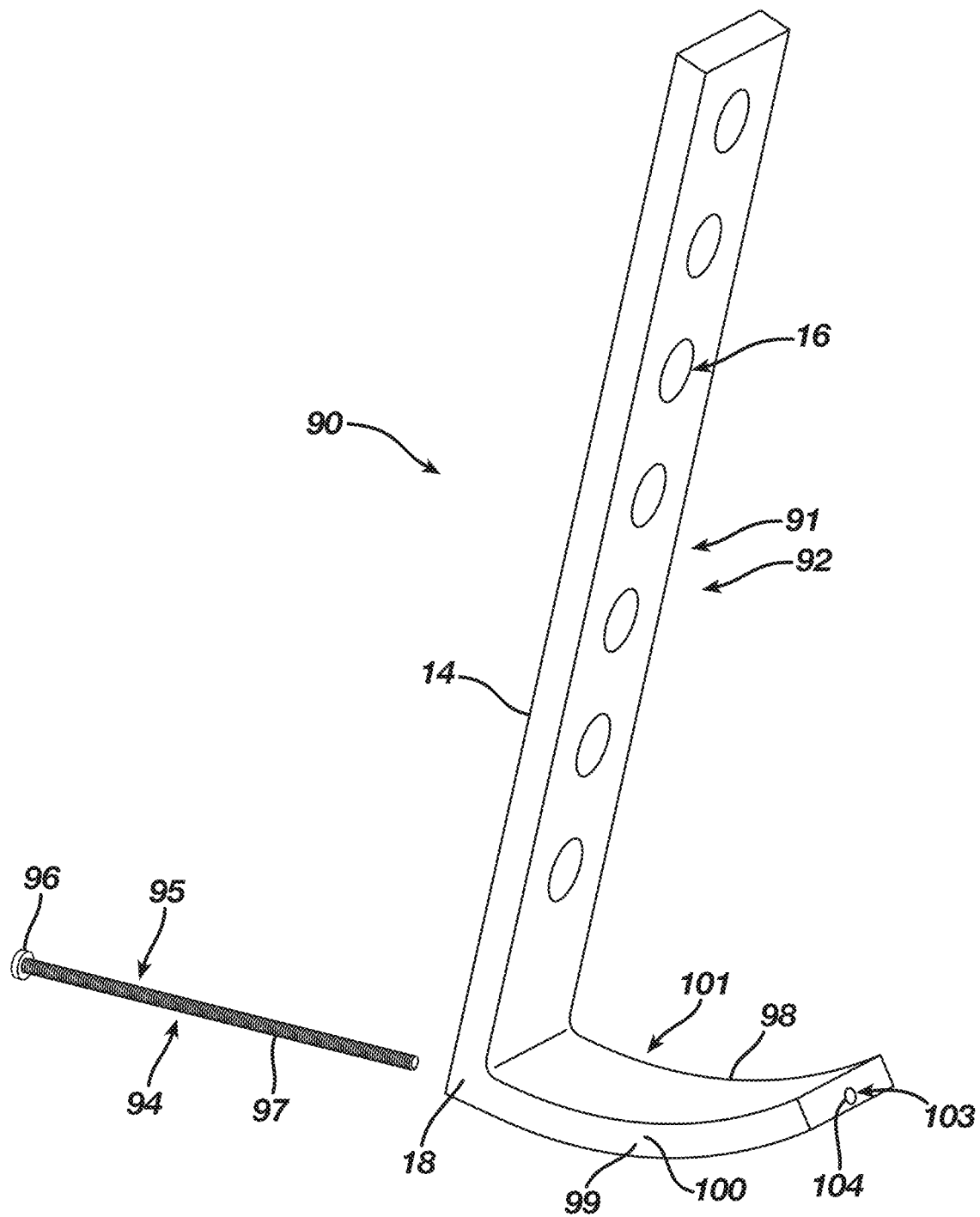
FIG. 14 is a top isometric view illustrating an orthopedic fixation system according to a third embodiment.
Figure 15A:
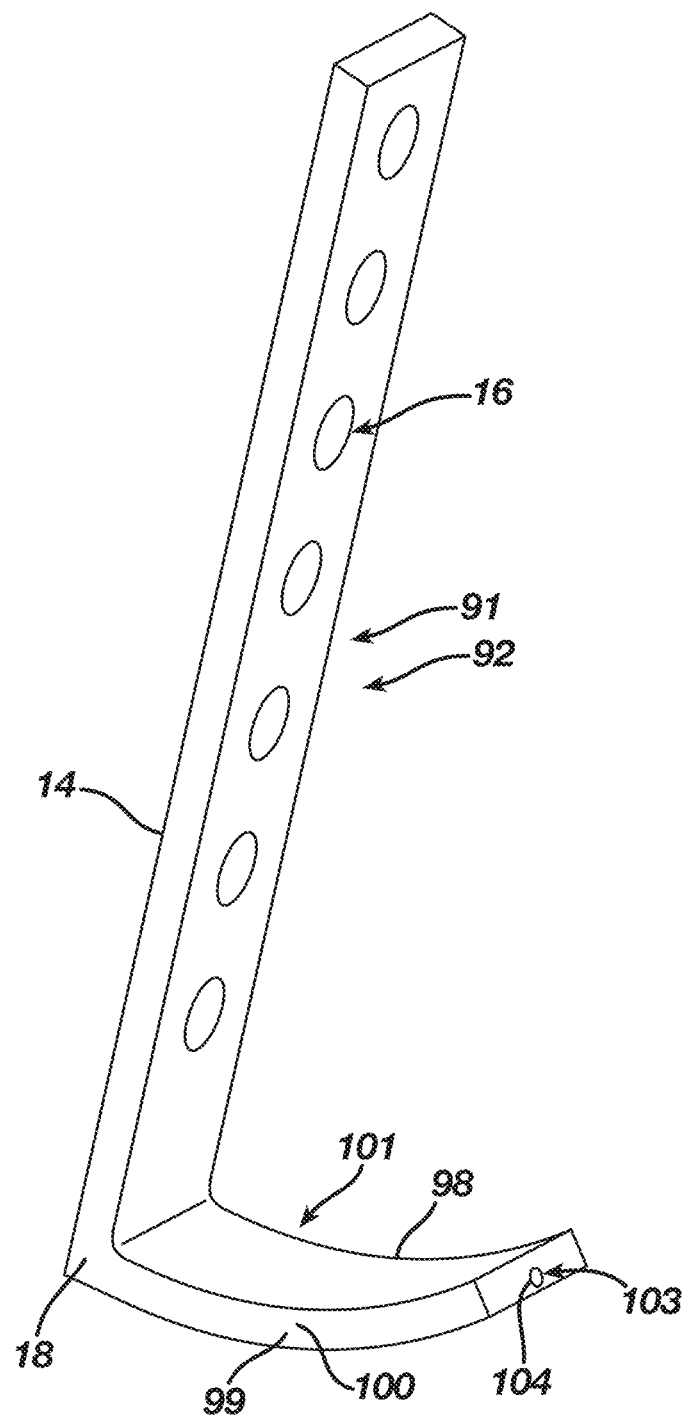
FIG. 15A is a top isometric view illustrating an implant of the orthopedic fixation system according to the third embodiment in a natural shape.
Figure 15B:
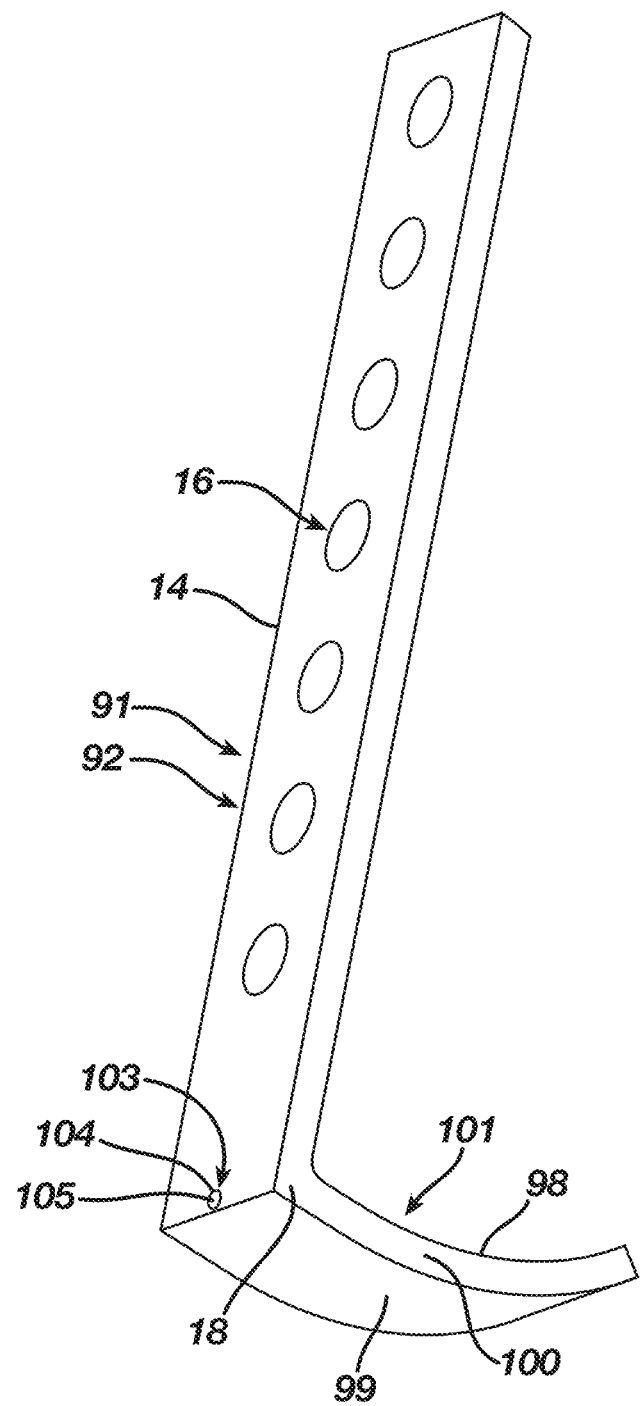
FIG. 15B is a bottom isometric view illustrating the implant of the orthopedic fixation system according to the third embodiment in the natural shape.
Figure 15C:
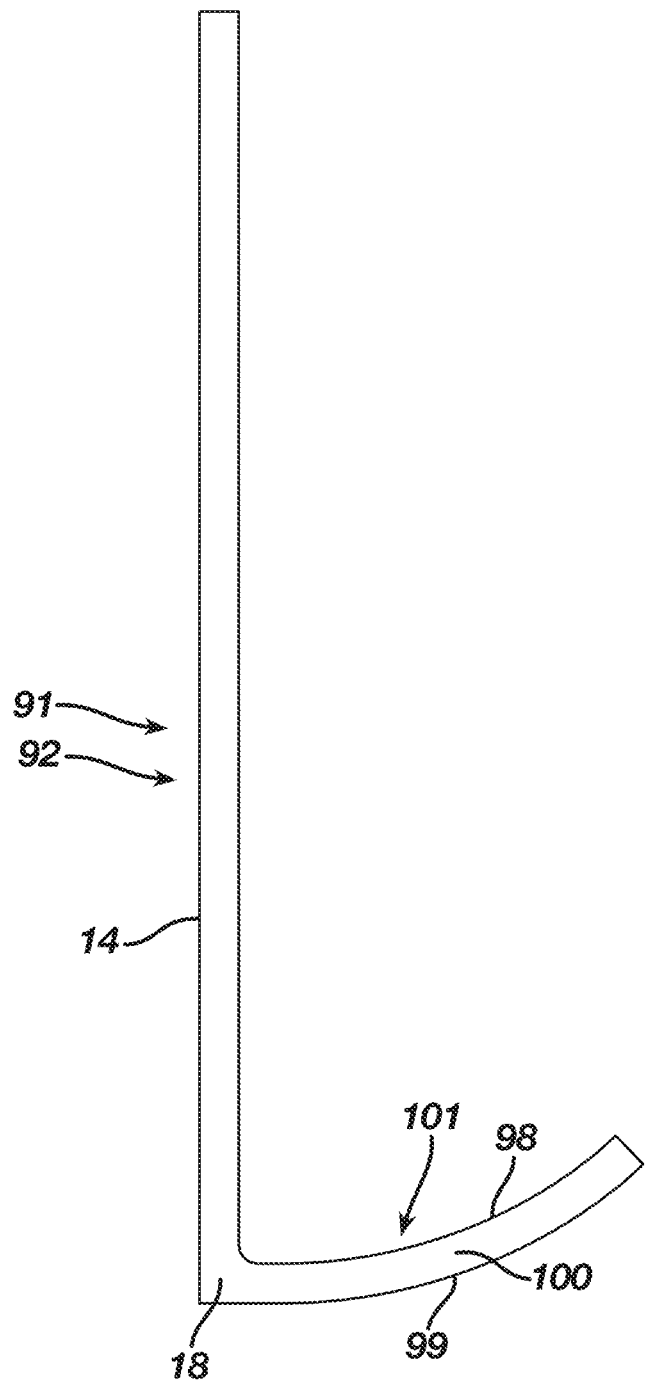
FIG. 15C is a side view illustrating the implant of the orthopedic fixation system according to the third embodiment in the natural shape.
Figure 15D:
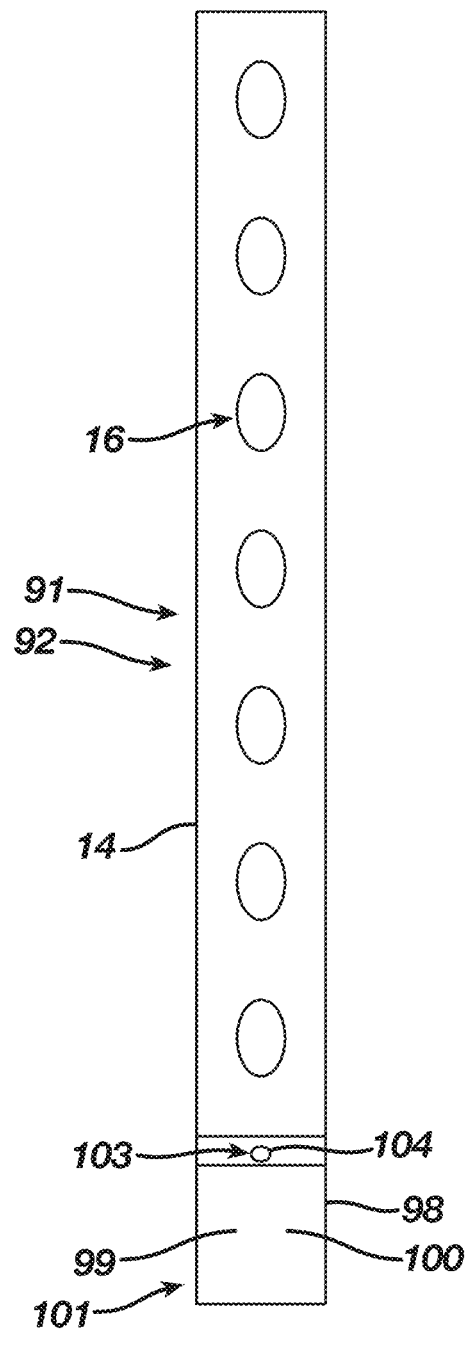
FIG. 15D is a front view illustrating the implant of the orthopedic fixation system according to the third embodiment in the natural shape.
Figure 15E:
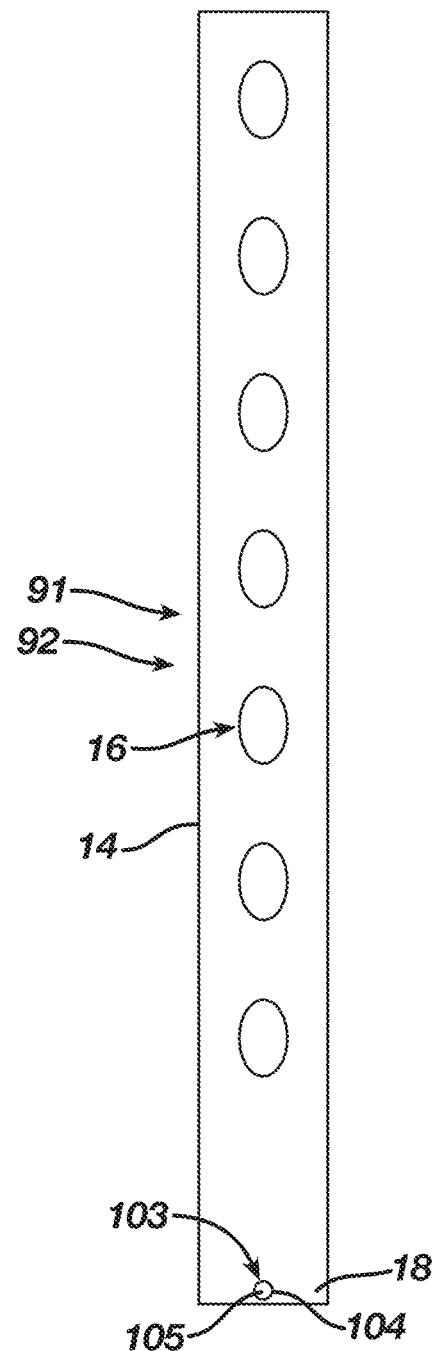
FIG. 15E is a rear view illustrating the implant of the orthopedic fixation system according to the first embodiment in the natural shape.
Figure 15F:
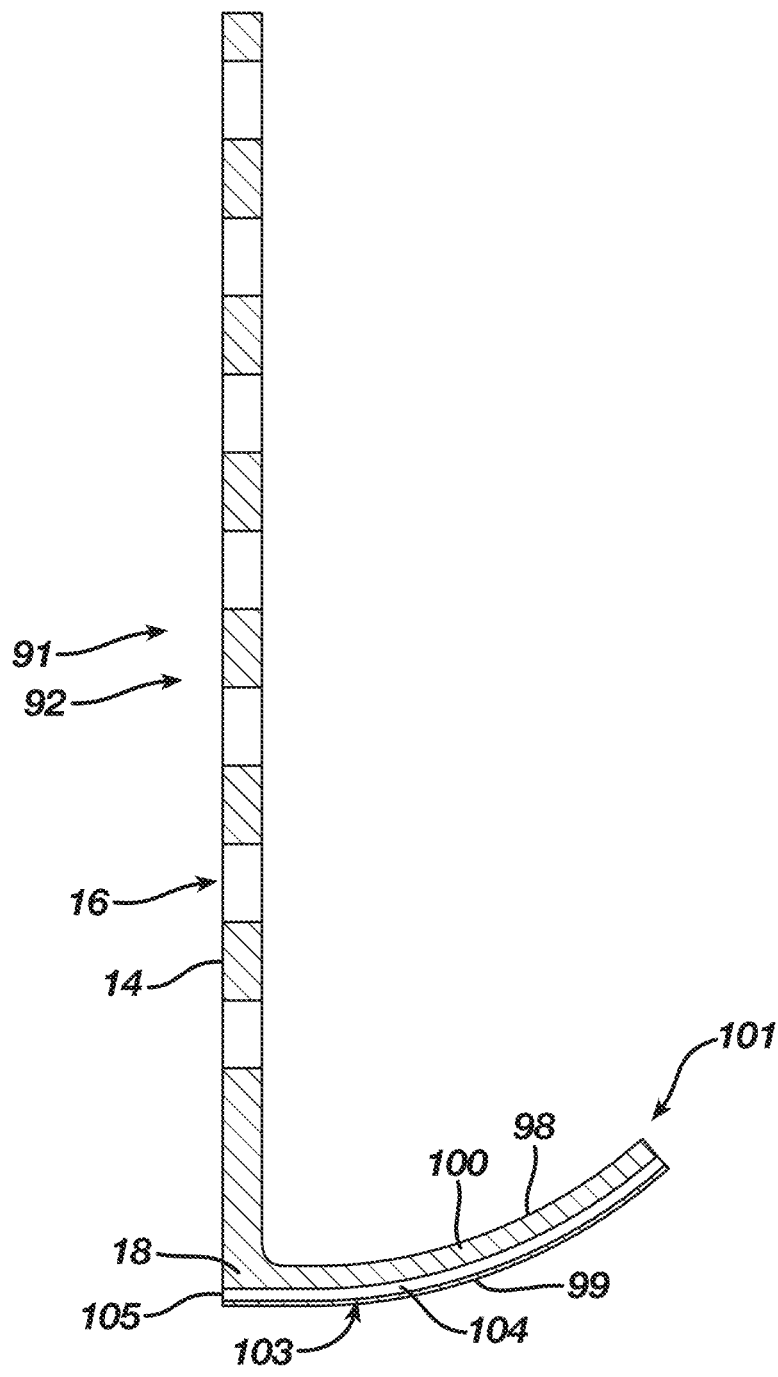
FIG. 15F is a cross-sectional side view illustrating the implant of the orthopedic fixation system according to the third embodiment in the natural shape.

In accordance with the orthopedic fixation system 70, the implant retainer 74, when engaged with the implant 71 as previously described, retains the implant 71 in the insertion shape 72 such that the implant 71 is ready for securing with bone, bones, or bone pieces, and, in particular, as illustrated in FIGS. 13A and 13B, with a first bone 81 and a second bone 82, which are presented herein as an example. A surgeon aligns the first bone 81 with the second bone 82 at a fixation zone 83 in an orientation that promotes fixation of the first bone 81 with the second bone 82 and a proper healing thereof. The surgeon forms a channel 84 in the first bone 81 configured to receive the blade segment 15 of the implant 71 therein. The surgeon then inserts the blade segment 15 of the implant 71 into the channel 84 with the plate segment 14 spanning the fixation zone 83 from the first bone 81 to the second bone 82. With the blade segment 15 implanted in the channel 84 and the plate segment 14 traversing the first and second bones 81 and 82, the surgeon secures the plate segment 14 with the second bone 82 using one or more fixation devices, such as bone screws 85, inserted through the one or more openings 16 and into the second bone 82. The surgeon, if necessary, can form one or more drill holes in the second bone 82 to assist in the insertion of the one or more bone screws 85 into the second bone 82. The implanting of the blade segment 15 into the first bone 81 in combination with the securing of the plate segment 14 to the second bone 82 affixes the implant 71 with the first and second bones 81 and 82 across the fixation zone 83.

In view of the implant 71 being affixed with the first and second bones 81 and 82 across the fixation zone 83, the surgeon removes the implant retainer 74 from the implant 71. More particularly, the surgeon removes the set screw 75 from the bore 79 by either pulling or unscrewing the set screw 75 from the bore 79. Upon the removal of the implant retainer 74 from the implant receiver 78 of the implant 71, the implant 71 attempts transition from the insertion shape 73 to the natural shape 72 whereby the implant 71 delivers the energy stored in the transition section 17 to the first bone 81, resulting in the implant 71 affixing the first bone 81 and the second bone 82 through an application of a compressive force to the fixation zone 83. The implant retainer 74 accordingly improves implantation of the implant 71 because the implant retainer 74 does not release its constraint of the implant 71 until the implant 71 is affixed to the first and second bones 81 and 82 across the fixation zone 83 thereof such that the implant retainer 74 prevents the implant 71 from prematurely delivering the energy stored therein to the first and second bones 81 and 82 at the fixation zone 83 thereof.

An orthopedic fixation system 90 according to a third embodiment as illustrated in FIGS. 14 and 17A-17C includes an implant 91 transitionable between a natural shape 92 and an insertion shape 93. The orthopedic fixation system 90 further includes an implant retainer 94 configured to engage the implant 91 and constrain the implant 91 in the insertion shape 93. The implant retainer 94 comprises a set screw 95 including a head 96 and a shank 97. The shank 97 may be smooth or preferably include threads that facilitate a more secure coupling of the implant retainer 94 with the implant 91.

Figure 16A:
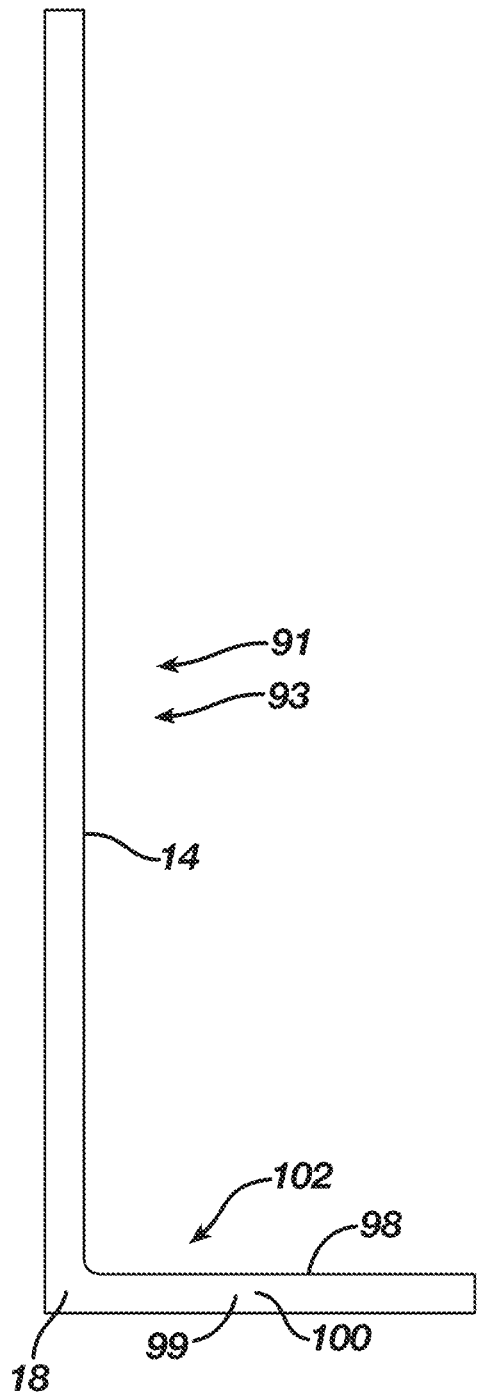
FIG. 16A is a side view illustrating the implant of the orthopedic fixation system according to the third embodiment in an insertion shape.
Figure 16B:
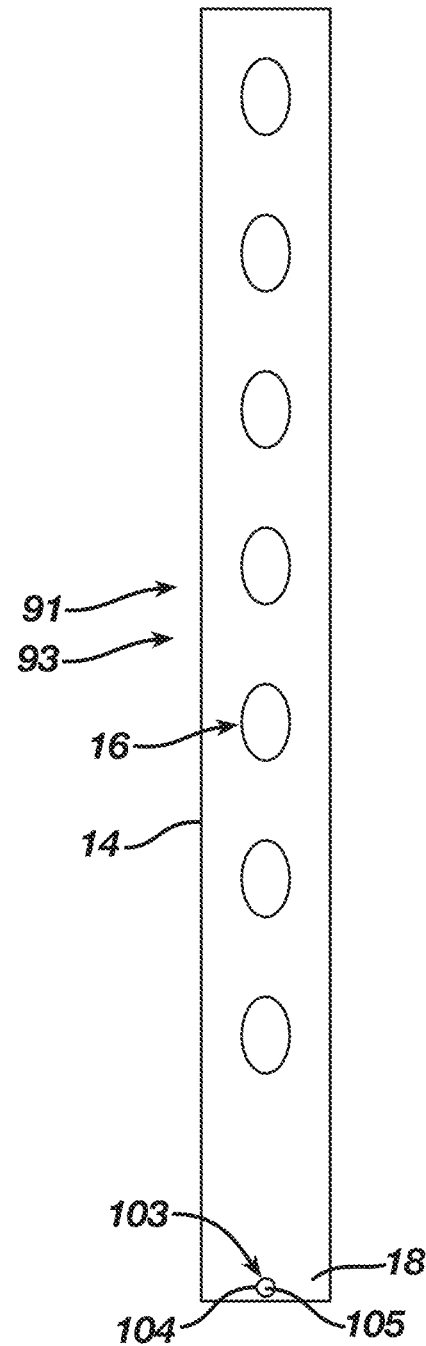
FIG. 16B is a rear view illustrating the implant of the orthopedic fixation system according to the third embodiment in the insertion shape.
Figure 16C:
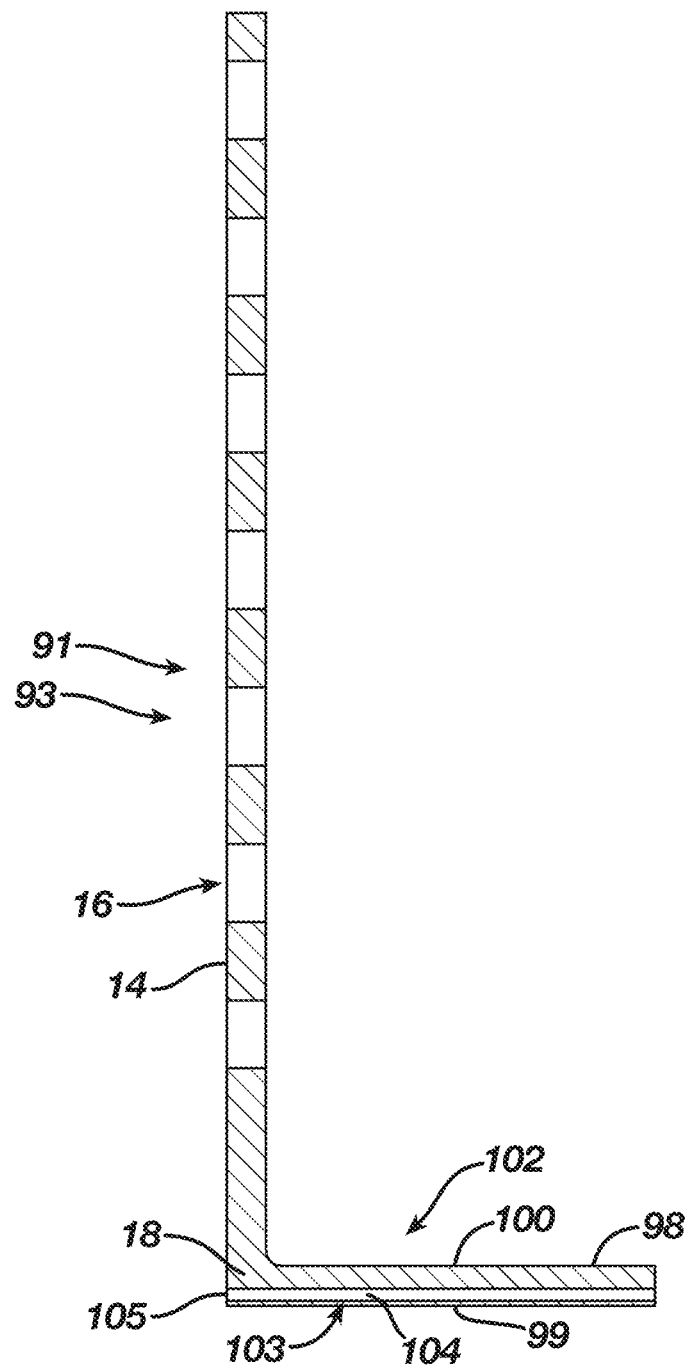
FIG. 16C is a cross-sectional side view illustrating the implant of the orthopedic fixation system according to the third embodiment in the insertion shape.
Figure 17A:
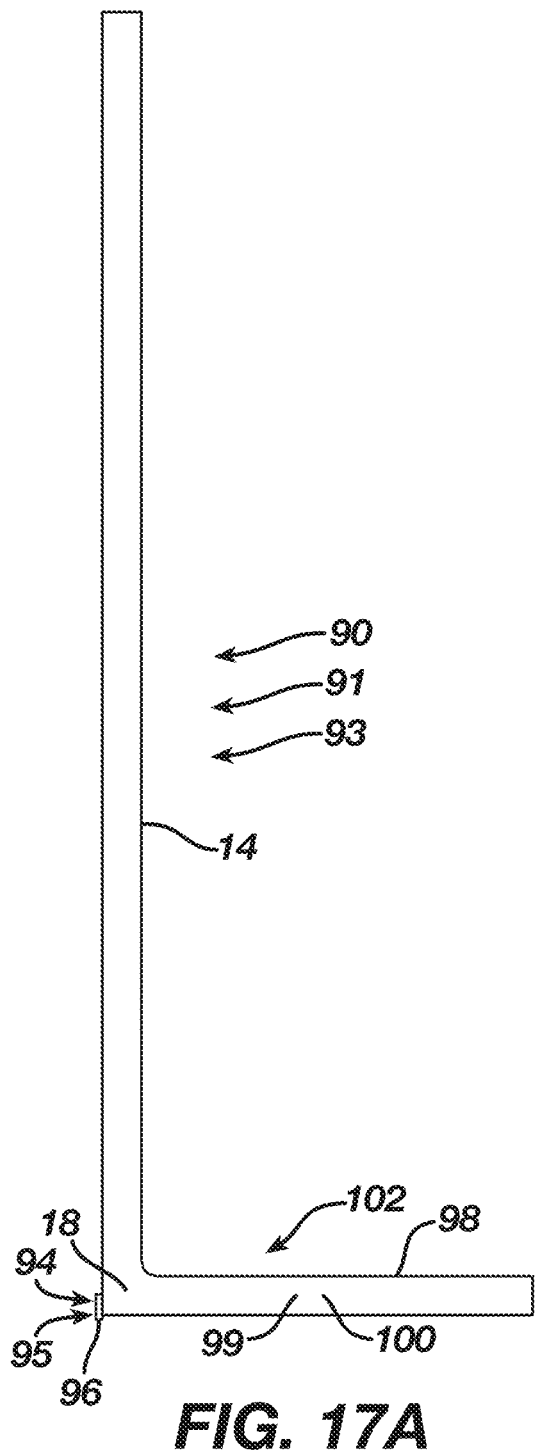
FIG. 17A is a side view illustrating the orthopedic fixation system according to the third embodiment wherein an implant retainer constrains the implant in the insertion shape.
Figure 17B:
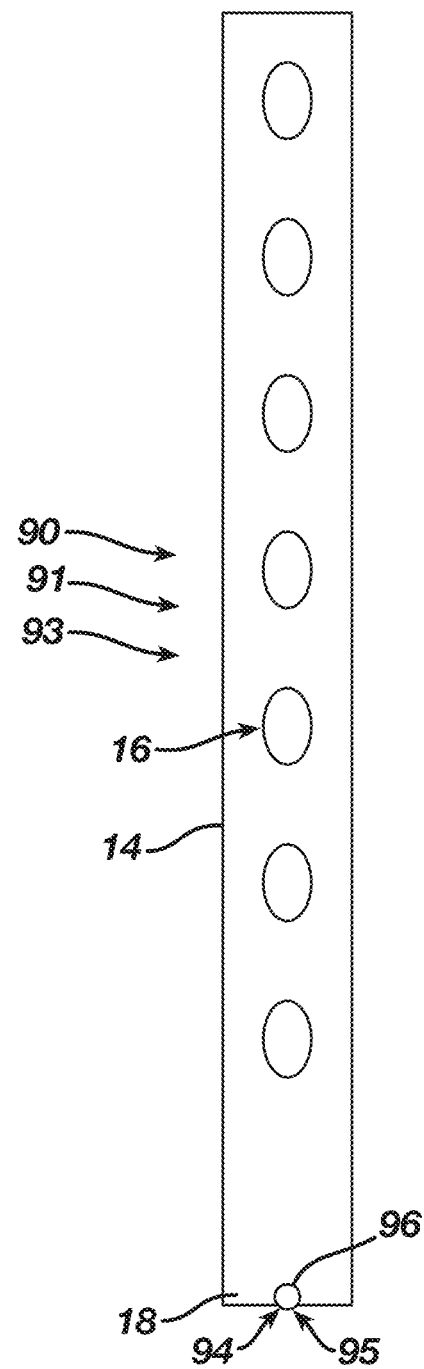
FIG. 17B is a rear view illustrating the orthopedic fixation system according to the third embodiment wherein the implant retainer constrains the implant in the insertion shape.
Figure 17C:
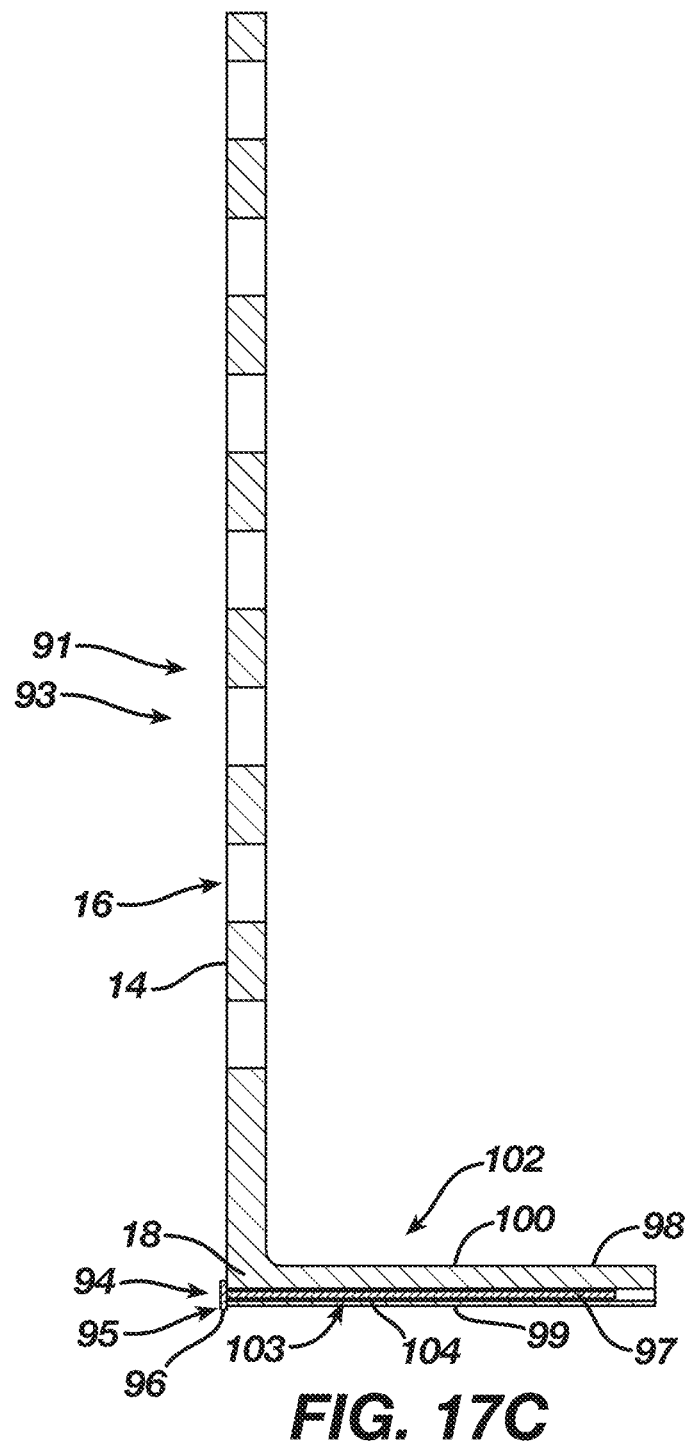
FIG. 17C is a cross-sectional side view illustrating the orthopedic fixation system according to the third embodiment wherein the implant retainer constrains the implant in the insertion shape.

FIGS. 14 and 15A-15F illustrate the implant 91 in the natural shape 92, whereas FIGS. 16A-16C illustrate the implant 91 in the insertion shape 93. The implant 91 is substantially similar in design and operation relative to the implants 10 and 71 of the orthopedic fixation systems 5 and 70 according to the first and second embodiments such that, for the sake of brevity, only differences therebetween will be described herein. Moreover, one of ordinary skill in the art will recognize that like parts of the implant 91 labeled with like numerals of the implants 10 and 71 incorporate a design and function as previously set forth in the detailed descriptions of the implants 10 and 71 of the orthopedic fixation systems 5 and 70 according to the first and second embodiments.

While the implant 91 includes the plate segment 14, the implant 91 includes a blade segment 98 extending from the plate segment 14 at the junction 18 of the plate segment 14 and the blade segment 98 whereby the blade segment 98 is substantially similar to the blade segments 15 of the implants 10 and 70 except the blade segment 98 includes a curve 99 and a transition section 100 at the curve 99 of the blade segment 98. In accordance with the blade segment 98 including the curve 99 and the transition section 100 at the curve 99, the regular inherent shape of the implant 91, as illustrated in FIGS. 14 and 15A-15F, is its natural shape 92 where the transition section 100 locates the blade segment 98 curved upwards towards the plate segment 14 to provide the implant 91 with a closed profile 101. Nevertheless, as illustrated in FIGS. 16A-16C, the implant 91 is deformable under the action of superelasticity or temperature dependent shape memory to its insertion shape 93 where the transition section 100 deforms to store energy while also moving the blade segment 98 planar to provide the implant 91 with an open profile 102 such that the insertion shape 93 of the implant 91 remains substantially the same as the insertion shapes 12 and 73 of the implants 10 and 71.

The implant 91, in order to facilitate its engagement by the implant retainer 94, includes a retainer receiver 103 traversing the transition section 100 configured to receive the implant retainer 94 therein. The retainer receiver 103 includes a securing feature in the form of a bore 104 traversing the transition section 100 located within the blade segment 98 at the curve 99 thereof. The bore 104 begins in an entrance 105 located within the plate segment 14 at the junction 18 of the plate segment 14 and the blade segment 98. The bore 104 traverses the junction 18 and further extends into and preferably through the blade segment 98 such that the bore 104 traverses the transition section 100. The bore 104, as described more fully herein, provides a point of engagement for the implant 91 with the implant retainer 94. The bore 104 may be smooth or preferably include threads that facilitate a more secure coupling of the set screw 95 with the implant 91.

Forming the orthopedic fixation system 90 includes mechanically deforming the implant 91 from the natural shape 92 to the insertion shape 93. More particularly, the implant 91 via the transition section 100 mechanically deforms to store energy while also moving the blade segment 98 planar such that the implant 91 transitions from the closed profile 101 to the open profile 102. Mechanical deformation of the implant 91 may include cooling of the implant 91 whereby the implant 91 transitions from its austenite phase to its martensite phase in order to facilitate an easier mechanical deformation of the implant 91 from the natural shape 92 to the insertion shape 93 prior to an engagement of the implant retainer 94 with the implant 91.

After mechanical deformation of the implant 91 from the natural shape 92 to the insertion shape 93, the set screw 95 at the shank 97 is aligned with the bore 104 with the shank 97 positioned at the opening 105 into the bore 104. The set screw 95 at the shank 97 is inserted into the bore 104 until the head 96 abuts the plate segment 14 at the opening 105, resulting in the set screw 95 at the shank 97 seating within the bore 104 with the shank 97 traversing the transition section 100. The set screw 95, when the bore 104 and thus the shank 97 of the set screw 95 are smooth, slides within the bore 104. Alternatively, the set screw 95, when the bore 104 and thus the shank 97 of the set screw 95 include threads, screws within the bore 104 using a driver device engaged with the set screw 95 at the head 96 thereof. The set screw 95 with the head 96 abutting the plate segment 14 at the junction 18 and the shank 97 inserted within the bore 104 spans the transition section 100 of the implant 91. In accordance therewith, the implant retainer 94, on account of the inserted set screw 95 spanning the transition section 100, constrains the implant 91 in the insertion shape 93 thereby preventing the implant 91 from returning to the natural shape 92.

Figure 18A:
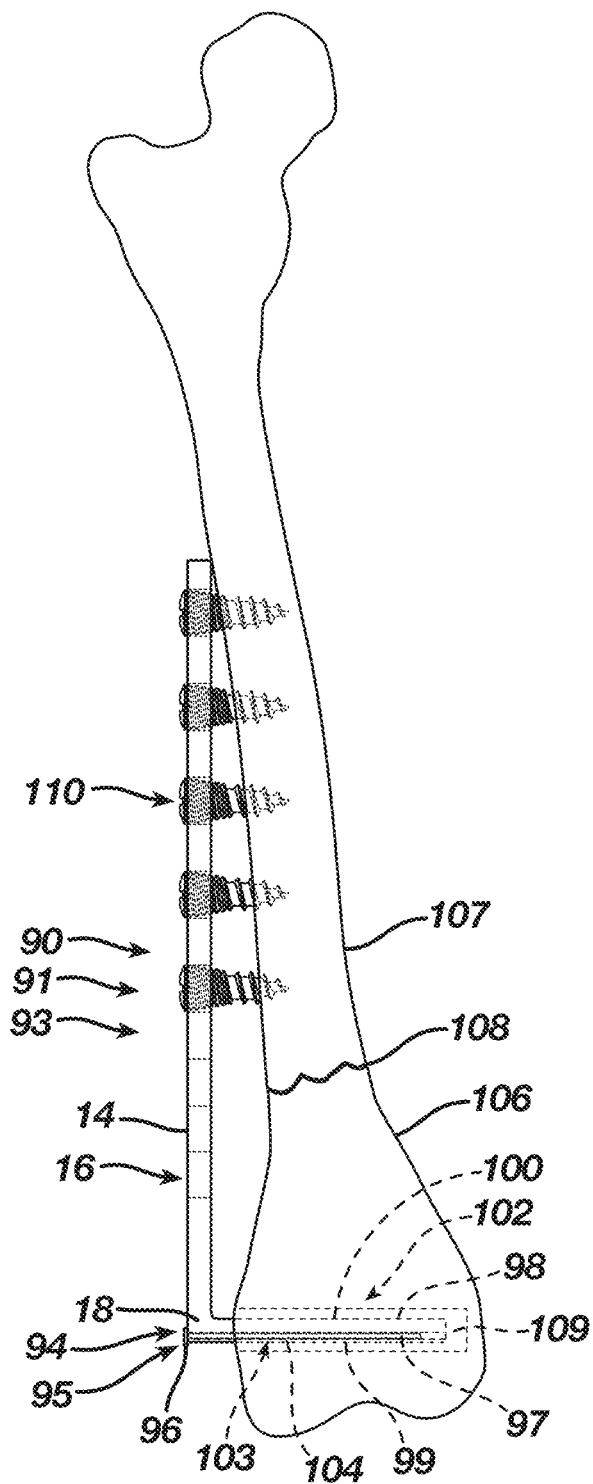
FIG. 18A is a side view illustrating implantation of the orthopedic fixation system according to the third embodiment wherein the implant retainer constrains the implant in the insertion shape.
Figure 18B:
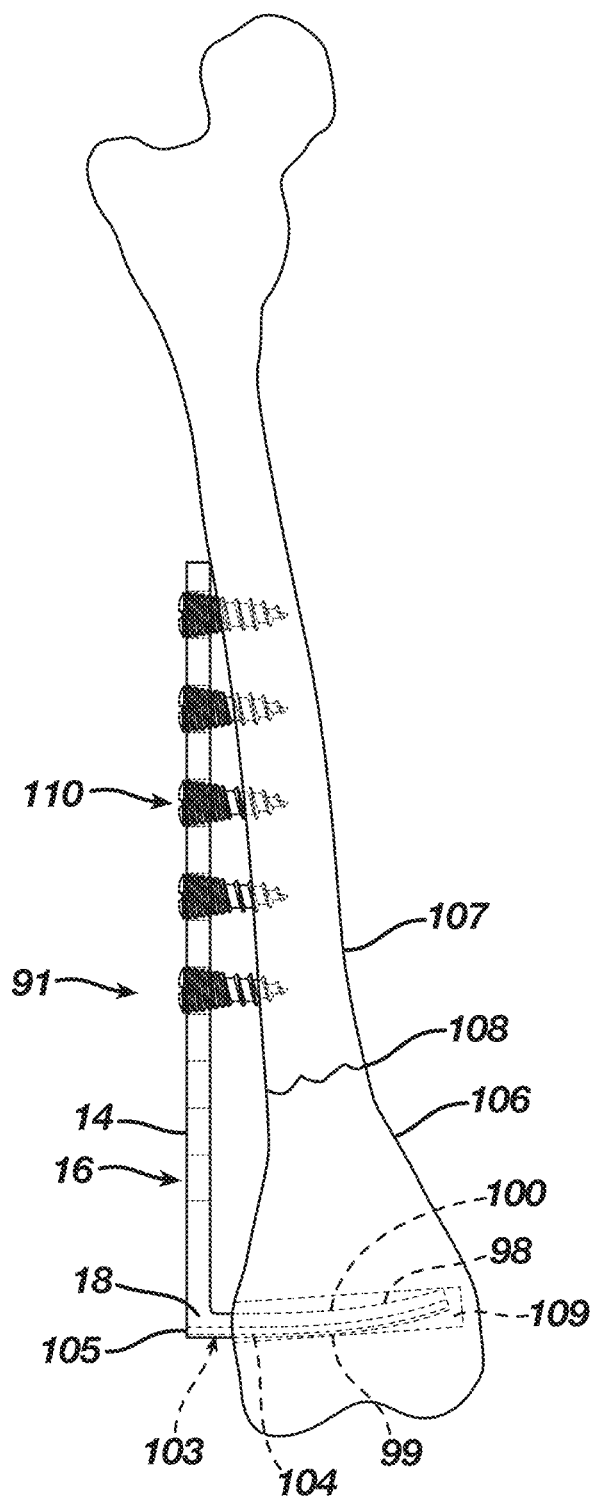
FIG. 18B is a side view illustrating implantation of the orthopedic fixation system according to the third embodiment wherein removal of the implant retainer releases the implant for attempted transition from the insertion shape to the natural shape.

In accordance with the orthopedic fixation system 90, the implant retainer 94, when engaged with the implant 91 as previously described, retains the implant 91 in the insertion shape 92 such that the implant 91 is ready for securing with bone, bones, or bone pieces, and, in particular, as illustrated in FIGS. 18A and 18B, with a first bone 106 and a second bone 107, which are presented herein as an example. A surgeon aligns the first bone 106 with the second bone 107 at a fixation zone 108 in an orientation that promotes fixation of the first bone 106 with the second bone 107 and a proper healing thereof. The surgeon forms a channel 109 in the first bone 106 configured to receive the blade segment 98 of the implant 91 therein. The surgeon then inserts the blade segment 98 of the implant 91 into the channel 109 with the plate segment 14 spanning the fixation zone 108 from the first bone 106 to the second bone 107. With the plate segment 98 implanted in the channel 109 and the plate segment 14 traversing the first and second bones 106 and 107, the surgeon secures the plate segment 14 with the second bone 107 using one or more fixation devices, such as bone screws 110, inserted through the one or more openings 16 and into the second bone 107. The surgeon, if necessary, can form one or more drill holes in the second bone 107 to assist in the insertion of the one or more bone screws 110 into the second bone 107. The implanting of the blade segment 98 into the first bone 106 in combination with the securing of the plate segment 14 to the second bone 107 affixes the implant 91 with the first and second bones 106 and 107 across the fixation zone 108.

In view of the implant 91 being affixed with the first and second bones 106 and 107 across the fixation zone 108, the surgeon removes the implant retainer 94 from the implant 91. More particularly, the surgeon removes the set screw 95 from the bore 104 by either pulling or unscrewing the set screw 95 from the bore 104. Upon the removal of the implant retainer 94 from the implant receiver 103 of the implant 91, the implant 91 attempts transition from the insertion shape 93 to the natural shape 92 whereby the implant 91 delivers the energy stored in the transition section 100 to the first bone 106, resulting in the implant 91 affixing the first bone 106 and the second bone 107 through an application of a compressive force to the fixation zone 108. The implant retainer 94 accordingly improves implantation of the implant 91 because the implant retainer 94 does not release its constraint of the implant 91 until the implant 91 is affixed to the first and second bones 106 and 107 across the fixation zone 108 thereof such that the implant retainer 94 prevents the implant 91 from prematurely delivering the energy stored therein to the first and second bones 106 and 107 at the fixation zone 108 thereof.

Although the present invention has been described in terms of the foregoing preferred embodiments, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

The invention claimed is:

1. An orthopedic fixation system, comprising:
an implant transitionable between a natural shape and an insertion shape whereby a transition of the implant from the natural shape to the insertion shape stores deliverable energy and a transition of the implant from the insertion shape to the natural shape delivers stored energy, the implant, comprising:
  a plate segment configured for placement adjacent a bone,
  a blade segment extending from the plate segment in a configuration whereby the blade segment inserts into the bone upon placement of the plate segment adjacent the bone,
  a transition section located within the blade segment at a junction of the plate segment and the blade segment, whereby the transition section deforms to move the implant between the natural shape and the insertion shape, and
  a retainer receiver traversing the transition section, the retainer receiver, comprising:
    a first aperture extending through the plate segment whereby the first aperture is located within the plate segment adjacent the junction of the plate segment and blade segment, and
    a second aperture extending through the blade segment whereby the second aperture is located within the blade segment adjacent the junction of the plate segment and blade segment; and
an implant retainer, upon transition of the implant from the natural shape to the insertion shape, being configured to engage the implant at the first aperture and the second aperture whereby the implant retainer spans the transition section such that the implant retainer constrains the implant and holds the implant in the insertion shape thereby preventing a transition of the implant from the insertion shape to the natural shape.

2. The orthopedic fixation system of claim 1, the implant retainer, comprising:
a first retention block including a first fastener whereby the first retention block at the first fastener engages the implant at the first aperture;
a second retention block including a second fastener whereby the second retention block at the second fastener engages the implant at the second aperture; and
a fastener configured to connect the first retention block with the second retention block whereby the connected first and second retention blocks span the transition section such that the connected first and second retention blocks constrain the implant and hold the implant in the insertion shape thereby preventing a transition of the implant from the insertion shape to the natural shape.

3. The orthopedic fixation system of claim 2, wherein:
the first retention block includes a first bore extending therethrough along a pathway from a rear of the first retention block to a first block interface of the first retention block;
the second retention block includes a second bore extending therethrough along a pathway from a block interface of the second retention block toward a rear of the second retention block;
the engagements of the first retention block and the second retention block with the implant places the first block interface next to the second block interface with the first bore in alignment with the second bore; and
the fastener inserts into the first bore and the second bore to connect the first retention block with the second retention block whereby the connected first and second retention blocks span the transition section such that the connected first and second retention blocks constrain the implant and hold the implant in the insertion shape thereby preventing a transition of the implant from the insertion shape to the natural shape.

4. The orthopedic fixation system of claim 2, the retainer receiver, comprising:
a first catch protruding into the first aperture; and
a second catch protruding into the second aperture.

5. The orthopedic fixation system of claim 4, wherein:
the first fastener includes a first post extending therefrom and a first detent extending from the first post;
the second fastener includes a second post extending therefrom and a second detent extending from the second post;
the engagement of the first retention block with the implant includes insertion of the first fastener into the first aperture whereby the first detent interlocks with the first catch;

the engagement of the second retention block with the implant includes insertion of the second fastener into the second aperture whereby the second detent interlocks with the second catch; and the fastener connects the first retention block with the second retention block with the first detent interlocked with the first catch and the second detent interlocked with the second catch whereby the connected first and second retention blocks span the transition section such that the connected first and second retention blocks constrain the implant and hold the implant in the insertion shape thereby preventing a transition of the implant from the insertion shape to the natural shape.

6. An orthopedic fixation system, comprising:
an implant transitionable between a natural shape and an insertion shape whereby a transition of the implant from the natural shape to the insertion shape stores deliverable energy and a transition of the implant from the insertion shape to the natural shape delivers stored energy, the implant, comprising:
  a plate segment,
  a blade segment extending from the plate segment,
  a transition section located within the blade segment at a junction of the plate segment and the blade segment, whereby the transition section deforms to move the implant between the natural shape and the insertion shape, and
  a retainer receiver, comprising a bore traversing the transition section; and
an implant retainer, comprising a set screw wherein, upon transition of the implant from the natural shape to the insertion shape, the set screw inserts into the bore whereby the set screw spans the transition section such that the set screw constrains the implant and holds the implant in the insertion shape thereby preventing a transition of the implant from the insertion shape to the natural shape.

7. The orthopedic fixation system of claim 6, wherein the bore begins in an entrance located within the plate segment at the junction of the plate segment and the blade segment, traverses the junction, and extends into the blade segment such that the bore traverses the transition section.

8. The orthopedic fixation system of claim 7, the implant retainer, comprising the set screw wherein, upon transition of the implant from the natural shape to the insertion shape, the set screw inserts into the bore beginning at the entrance thereof whereby the set screw extends into the blade segment while spanning the transition section such that the set screw constrains the implant and holds the implant in the insertion shape thereby preventing a transition of the implant from the insertion shape to the natural shape.

9. An orthopedic fixation system, comprising:
an implant transitionable between a natural shape and an insertion shape whereby a transition of the implant from the natural shape to the insertion shape stores deliverable energy and a transition of the implant from the insertion shape to the natural shape delivers stored energy, the implant, comprising:
  a plate segment,
  a blade segment extending from the plate segment, the blade segment including a curve,
  a transition section located within the blade segment at the curve, whereby the transition section deforms to move the implant between the natural shape and the insertion shape, and
  a retainer receiver, comprising a bore traversing the transition section; and
an implant retainer, comprising a set screw wherein, upon transition of the implant from the natural shape to the insertion shape, the set screw inserts into the bore whereby the set screw spans the transition section such that the set screw constrains the implant and holds the implant in the insertion shape thereby preventing a transition of the implant from the insertion shape to the natural shape.

10. The orthopedic fixation system of claim 9, wherein the bore begins in an entrance located within the plate segment at a junction of the plate segment and the blade segment, traverses the junction, and extends into the blade segment such that the bore traverses the transition section.

11. The orthopedic fixation system of claim 10, the implant retainer, comprising the set screw wherein, upon transition of the implant from the natural shape to the insertion shape, the set screw inserts into the bore beginning at the entrance thereof whereby the set screw extends into the blade segment while spanning the transition section such that the set screw constrains the implant and holds the implant in the insertion shape thereby preventing a transition of the implant from the insertion shape to the natural shape.

\* \* \* \* \*